(12) United States Patent
Sakakihara et al.

(10) Patent No.: US 8,484,470 B2
(45) Date of Patent: Jul. 9, 2013

(54) AUTHENTICATION SYSTEM, AUTHENTICATION DEVICE AND RECORDING MEDIUM

(75) Inventors: Hironori Sakakihara, Kawasaki (JP); Fumio Honda, Kawasaki (JP); Noboru Iwamatsu, Kawasaki (JP); Kiyohiko Ishikawa, Setagaya (JP); Shunji Sunasaki, Setagaya (JP); Arisa Fujii, Setagaya (JP)

(73) Assignees: Fujitsu Limited, Kawasaki (JP); Nippon Hoso Kyokai, Tokyo (JP)

(*) Notice: Subject to any disclaimer, the term of this patent is extended or adjusted under 35 U.S.C. 154(b) by 301 days.

(21) Appl. No.: 12/838,851

(22) Filed: Jul. 19, 2010

(65) Prior Publication Data

US 2010/0281521 A1 Nov. 4, 2010

Related U.S. Application Data

(63) Continuation of application No. PCT/JP2009/050558, filed on Jan. 16, 2009.

(30) Foreign Application Priority Data

Jan. 18, 2008 (JP) ................................ 2008-009769

(51) Int. Cl.
*H04L 29/06* (2006.01)
(52) U.S. Cl.
USPC .............................................. 713/168; 726/2
(58) Field of Classification Search
USPC ........................... 726/2, 3, 4, 5; 713/168, 173
See application file for complete search history.

(56) References Cited

U.S. PATENT DOCUMENTS

2003/0055894 A1* 3/2003 Yeager et al. ................. 709/204
2004/0039917 A1* 2/2004 Ross .............................. 713/179

FOREIGN PATENT DOCUMENTS

| JP | 2004-355358 | 12/2004 |
| JP | 2006-185171 | 7/2006 |
| JP | 2007-87081 | 4/2007 |
| JP | 2007-272583 | 10/2007 |

OTHER PUBLICATIONS

Hiroshi Sunaga et al., "The General Review of P2P[II]:P2P Technologies," The Journal of the Institute of Electronics, Information and Communication Engineers, vol. 87, No. 10, Oct. 1, 2004, pp. 887-896.
English language International Search Report for PCT/JP2009/050558, mailed on Feb. 24, 2009.
Japanese Office Action issued Nov. 13, 2012 in corresponding Japanese Patent Application No. 2008-009769.
Masashi Yamada et al., "Brokerless trust control for supporting community activation", 3rd Forum on Information Technology, Collected Papers vol. 4, Aug. 2004, pp. 377-380.

* cited by examiner

*Primary Examiner* — Edward Zee
(74) *Attorney, Agent, or Firm* — Staas & Halsey LLP

(57) ABSTRACT

An authentication system includes node devices, wherein a first node device transmits the authentication information thereof to a second node device, the second node device selects third node devices that are requested to verify the validity of the received authentication information, and transmits the authentication information to each of the selected third node devices, the third node device records verification information that is used to verify the validity of the authentication information of the first node device, verifies the validity of the authentication information on the basis of the authentication information and verification information, and transmits the result information to the second node device, and the second node device further derives weighted values indicating the reliability of the each verification of the third node devices and authenticates the first node device on the basis of the each result information and the each weighted value received from the third node devices.

10 Claims, 17 Drawing Sheets

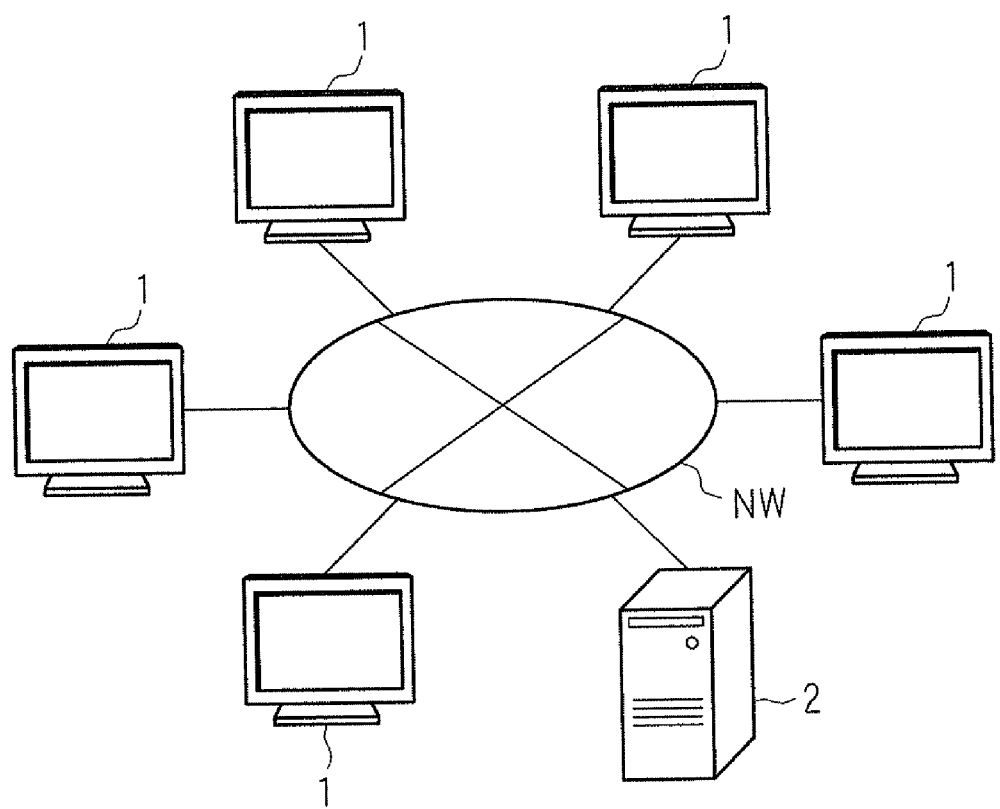
F I G. 2

FIG. 5

| IP ADDRESS | PORT NUMBER | NODE ID | PEER INFORMATION | AMOUNT OF TRAFFIC (MB) | NUMBER OF VERIFICATION TIMES | DEGREE OF CONTRIBUTION TO P2P |
|---|---|---|---|---|---|---|
| 192.168.1.1 | 10000 | 0001 | 0x001..100 | 150 | 2 | +1 |
| 192.168.1.2 | 10000 | 0002 | 0x001..101 | 200 | 2 | +3 |
| 192.168.1.3 | 10000 | 0003 | 0x001..110 | 10 | 1 | 0 |

FIG. 9

| | FIRST IN RELIABILITY | SECOND IN RELIABILITY | THIRD IN RELIABILITY | FOURTH IN RELIABILITY | FIFTH IN RELIABILITY |
|---|---|---|---|---|---|
| EXAMPLE 1 | 0.5 | 0.25 | 0.25 | — | — |
| EXAMPLE 2 | 0.5 | 0.5 | — | — | — |
| EXAMPLE 3 | 0.4 | 0.3 | 0.2 | 0.1 | — |

AUTHENTICATION SYSTEM, AUTHENTICATION DEVICE AND RECORDING MEDIUM

CROSS-REFERENCE TO RELATED APPLICATIONS

This continuation application claims the benefit under 35 U.S.C. Section 111(a), of PCT International Application No. PCT/JP2009/050558, filed Jan. 16, 2009, which claimed priority to Japanese Application No. 2008-009769, filed Jan. 18, 2008, the entire disclosures of which are incorporated by reference as a part of this application.

FIELD

The embodiments discussed herein are related to an authentication system, including with a plurality of node devices capable of executing communication via a communication network, for authenticating one of the node devices by verifying the validity of the authentication information of the one node device on the basis of the verification information recorded in the other plurality of node devices, to an authentication device used for the authentication system, and to a recording medium storing a computer program for implementing the device is recorded.

BACKGROUND

A peer-to-peer (hereafter referred to as P2P) communication system in which messages are relayed between client devices (node devices), different from a client-server (hereafter referred to as C-S) communication system, is attracting attention. Since the P2P communication system performs communication processing, such as retrieval and transfer of files, between the nodes, the P2P communication system is advantageous over the C-S communication system in which the processing load of the specific server device thereof increases.

In the C-S communication system in which files are delivered from the server device, the server device performs authentication processing for a client device serving as a destination, thereby providing protection against copyright and security, for example, and preventing the unauthorized leakage of files. In order to make use of the advantage of the P2P communication system, the P2P communication system is needed to build an authentication system that performs authentication between the node devices and prevents the unauthorized leakage of files. For example, Japanese Patent Application Laid-open Publication No. 2006-185171 discloses a P2P authentication system. The P2P authentication system includes a node device (hereafter referred to as an authentication node) for performing authentication and a plurality of node devices (hereafter referred to as verification nodes) for verifying the validity of the authentication information due to the request from the authentication node.

On the basis of the respective pieces of result information received from the plurality of verification nodes, the authentication node performs authentication. In the case that the authentication has succeeded, the authentication node provides services, such as the transmission of files. However, inconsistency may occur in the verification results indicated by the plural pieces of the received result information; in other words, differences may occur in the judgment results of the validity of the authentication information. This kind of situation may occur, for example, in the case that some of the verification nodes have old verification information, or an invalid node device has returned result information in response to the request for the verification. In the case that there is inconsistency in the verification results, the authentication node transmits the authentication information to the administrative node device and requests the administrative node device to judge the validity of the authentication information or makes a majority decision on the basis of the judgment results according to the result information, thereby judging whether the authentication has succeeded.

However, in the conventional P2P authentication system, in the case that the method in which the authentication node requests the administrative node device to judge the validity of the authentication information is used and that inconsistency occurs in the results of the verification requested, the processing load of the specific administrative node device increases. Hence, there is a problem that the advantage of the P2P authentication system is impaired.

Furthermore, in the case that the method in which the judgment is made by a majority decision is used, if numerous verification nodes having old verification information are included in the verification nodes having been requested to judge the validity, for example, a misjudgment is made, whereby there is a problem that the authentication lacks in accuracy.

SUMMARY

According to an aspect of the embodiments, an authentication system includes: a plurality of node devices; wherein a first node device includes a unit for transmitting the authentication information thereof to a second node device, the second node device includes a unit for selecting a plurality of third node devices that are requested to verify the validity of the received authentication information, and a unit for transmitting the authentication information to each of the selected plurality of third node devices, each of the third node device includes a unit for recording verification information that is used to verify the validity of the authentication information of the first node device, a unit for verifying the validity of the authentication information on the basis of the received authentication information and the recorded verification information, and a unit for transmitting the result information indicating the result of the verification to the second node device, and the second node device further includes a deriving unit for deriving weighted values indicating the reliability of the each verification of the plurality of third node devices and a unit for authenticating the first node device on the basis of the each result information and the each weighted value received from the plurality of third node devices.

The object and advantages of the invention will be realized and attained by the elements and combinations particularly pointed out in the claims. It is to be understood that both the foregoing general description and the following detailed description are exemplary and explanatory and are not restrictive of the embodiment, as claimed.

BRIEF DESCRIPTION OF THE DRAWINGS

FIG. 2 is a conceptual diagram illustrating an example of an authentication system according to Embodiment 1.

FIG. 5 is a conceptual view illustrating examples of recorded contents in the node information recording table of the node device used in the authentication system according to Embodiment 1.

FIG. 9 is a table illustrating examples of the weighted values derived by the authentication node used in the authentication system according to Embodiment 1.

DESCRIPTION OF EMBODIMENTS

Embodiment 1

Figure 1:
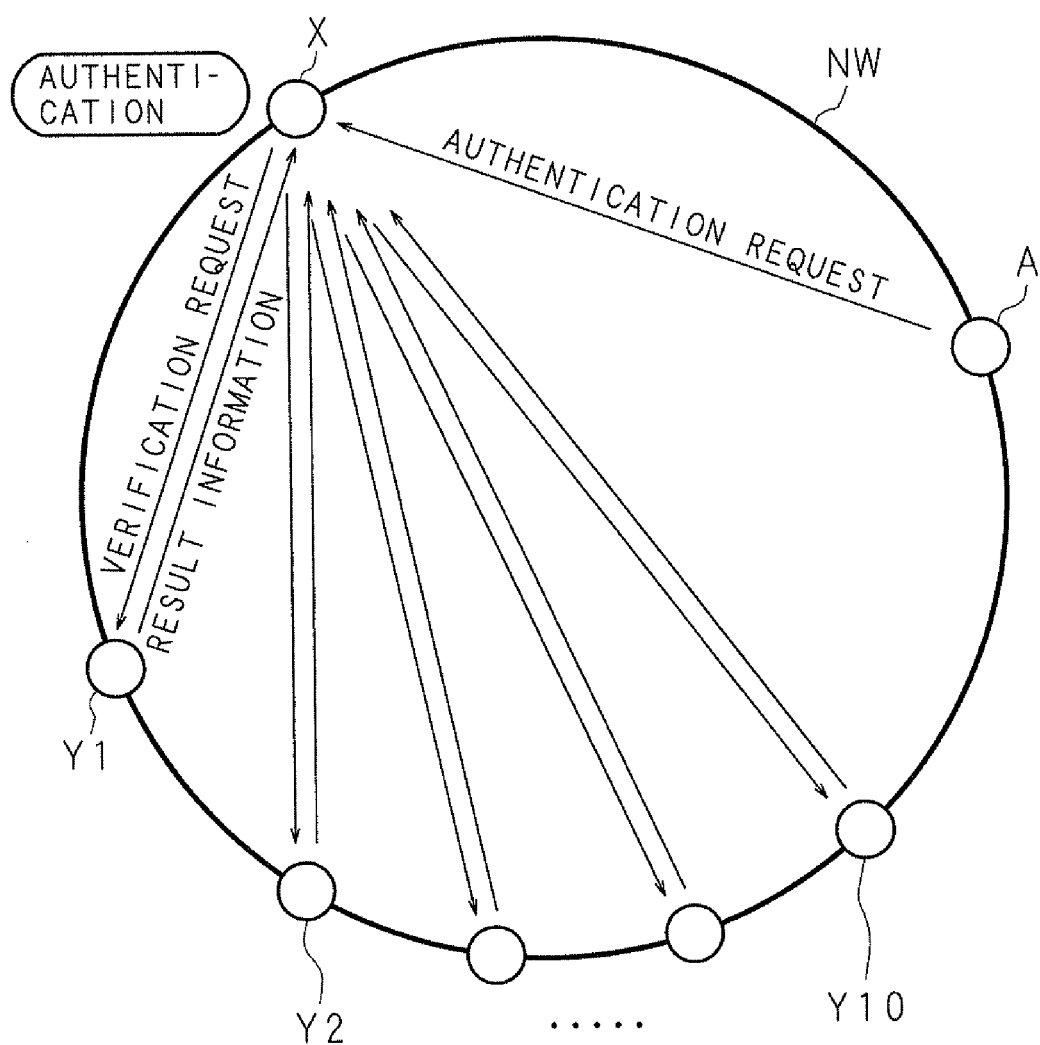
FIG. 1 is a conceptual diagram illustrating the conventional authentication system.

FIG. 1 is a conceptual diagram illustrating the conventional authentication system. FIG. 1 illustrates a communication network and a plurality of node devices included in a P2P communication system. A node ID is assigned to each node device as identification information. Such node IDs are assigned from an administrative node device for administrating the node IDs of all the node devices when the node devices are connected to the communication network, for example. In addition, each node device has peer information as position information indicating its position in a hash space serving as a logical space. The peer information is a hash value derived by processing the node ID assigned to each node device using a hash function. According to the peer information, a plurality of node devices can be distributed uniformly at random in a 160-bit hash space, for example. When it is assumed that the node ID of a node device A is IDA, for example, the peer information HA of the node device A is derived as a 160-bit value represented by a binary number, such as 001 . . . 100, according to the following Expression (a) using a hash function SHA-1.

$$HA = SHA\text{-}1(IDA) \qquad \text{Expression (a)}$$

where HA is the peer information of the node device A, IDA is the node ID of the node device A, and SHA-1( ) is a hash function.

In a P2P authentication system, authentication processing is performed using information HA+α relating to the node device A and derived from the following expression (b). FIG. 1 schematically illustrates processing in which a node device X (hereafter referred to as an authentication node X) authenticates the node device A (hereafter referred to as an object node A). When the object node A is connected to the communication network, for example, the administrative node device assigns a node ID to the object node A and transmits authentication information that is used to authenticate the object node A to each of a plurality of node devices Y1, Y2, . . . , Y10 (hereafter referred to as verification nodes Y1, Y2, . . . , Y10) selected on the basis of the node ID. The plurality of verification nodes Y1, Y2, . . . , Y10 record the received authentication information of the object node A as verification information that is used to verify the authentication information of the object node A. The administrative node device selects a plurality of node devices relating to the peer information indicating positions close to the position in the hash space indicated by the information relating to the object node A and derived according to Expression (b) as destinations to which the peer information of the object node A is transmitted. The situation in which the positions are close to the position in the hash space is a situation in which the high order bits of their hash values are coincident with each other, for example.

$$HA+\alpha = SHA\text{-}1(IDA+\alpha) \qquad \text{Expression (b)}$$

where HA+α is information relating to the node device A, IDA is the node ID of the node device A, SHA-1( ) is a hash function, and α is a constant.

In the case that the object node A requests authentication to the authentication node X, the object node A transmits an authentication request including its node ID and authentication information to the authentication node X. The authentication node X derives information relating to the object node A on the basis of the node ID of the object node A according to the above-mentioned Expression (b) and selects a plurality of node devices relating to the peer information indicating positions close to the position in the logical space indicated by the derived information relating to the object node A. It is assumed that the verification nodes Y1, Y2, . . . , Y10 have been selected. The authentication node X transmits a verification request for requesting the verification of the validity of the authentication information of the object node A. The verification request includes the authentication information of the object node A. Each of the verification nodes Y1, Y2, . . . , Y10 is subjected to a judgment as to whether the verification node has verification information relating to the object node A is present. In the case that the verification node has the verification information, the verification node compares the authentication information with the verification information, thereby verifying the validity of the authentication information. Then, the verification nodes Y1, Y2, . . . , Y10 transmit result information indicating the results of the verification to the authentication node X.

On the basis of the result information received from each of verification nodes Y1, Y2, . . . , Y10, the authentication node X authenticates the object node A. In the case that the authentication has succeeded, the authentication node X provides services, such as the transmission of files. However, there may occur inconsistency in the verification results indicated by the plurality of the received result information; in other words, there may occur differences in the judgment results of the validity of the authentication information. This kind of situation may occur, for example, in the case that some of the verification nodes have old verification information, or an invalid node device has returned result information in response to the request for the verification. In the case that the there is inconsistency in the verification results, the authentication node X transmits the authentication information to the administrative node device and requests the administrative node device to judge the validity of the authentication information or makes a majority decision on the basis of the judgment results according to the result information, thereby judging whether the authentication has succeeded.

FIG. 2 is a conceptual diagram illustrating an example of an authentication system according to Embodiment 1. Symbols 1, 1, . . . in FIG. 2 designates a plurality of node devices functioning as authentication devices. The node devices 1, 1, . . . are each connected to a communication network NW and function as a peer-to-peer (hereafter referred to as P2P) communication system in which communication, such as the retrieval and transfer of various kinds of information (files), is performed mutually via the communication network NW. Furthermore, an administrative node device 2 for administrating information relating to all the node devices 1, 1, . . . is also connected to the communication network NW.

Figure 3:
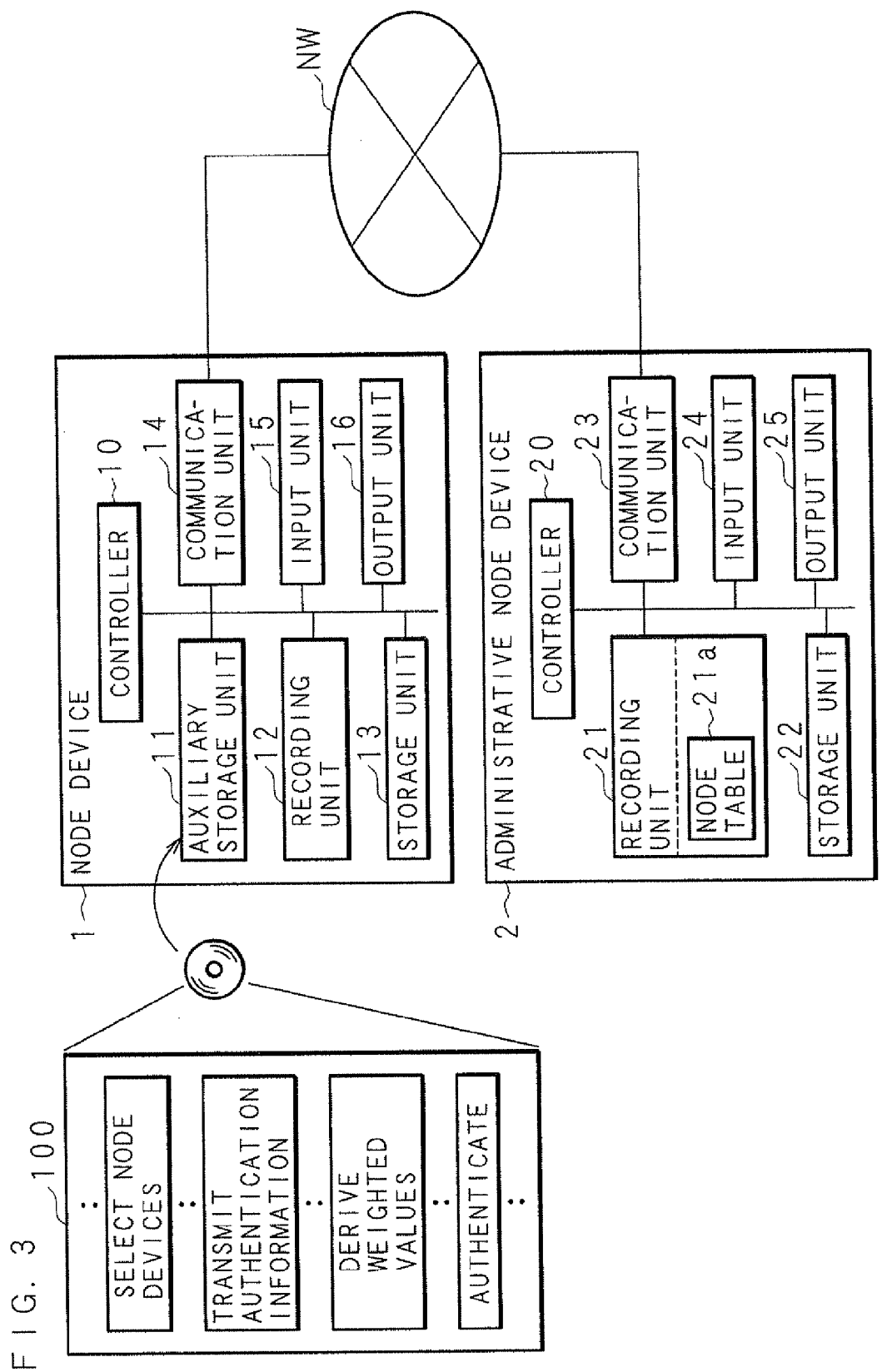
FIG. 3 is a block diagram illustrating an example of the hardware of various devices used for the authentication system according to Embodiment 1.

FIG. 3 is a block diagram illustrating an example of the hardware of various devices used for the authentication system according to Embodiment 1. The node device 1 includes a controller 10, such as a CPU, for controlling the entire device and executing various kinds of processing, an auxiliary storage unit 11, such as a CD-ROM drive, for reading various kinds of information from a recording medium, such as a CD-ROM, on which various kinds of information, such as a computer program 100 and data, are recorded, a recording unit 12, such as a hard disk, for recording the various kinds of information read by the auxiliary storage unit 11, and a storage unit 13, such as a RAM, for storing information generated temporarily. The node device 1 stores the computer program 100 recorded in the recording unit 12 into the storage unit 13 and executes the computer program 100 under the control of the controller 10, thereby attaining various functions, such as functions relating to the authentication devices. Furthermore, the node device 1 includes a communication unit 14, such as a communication port, connected to the communication network NW to perform communication, an input unit 15, such as a mouse and a keyboard, and an output unit 16, such as a monitor and a printer.

The administrative node device 2 includes a controller 20, a recording unit 21, a storage unit 22, a communication unit 23, an input unit 24, and an output unit 25. Part of the recording area of the recording unit 21 of the administrative node device 2 is used as a node table 21a in which the node IDs serving as identification information for identifying the respective node devices 1, 1, . . . , the IP addresses and the port numbers of the respective node devices 1, 1, . . . , the authentication information of the respective node devices 1, 1, . . . , and the peer information of the respective node devices 1, 1, . . . , are recorded so as to be associated with one another. The peer information is a hash value derived by processing the node ID assigned to each node device 1 using a hash function. According to the peer information, a plurality of node devices 1, 1, . . . can be distributed uniformly at random in a 160-bit hash space, for example. When it is assumed that the node ID of the node device A is IDA, for example, the peer information HA of the node device A is derived as a 160-bit value represented by a binary number, such as 001 . . . 100, according to the following Expression (1) using a hash function SHA-1.

$$HA=SHA-1(IDA) \hspace{2cm} \text{Expression (1)}$$

where HA is the peer information of the node device A, IDA is the node ID of the node device A, and SHA-1( ) is a hash function.

Figure 4:
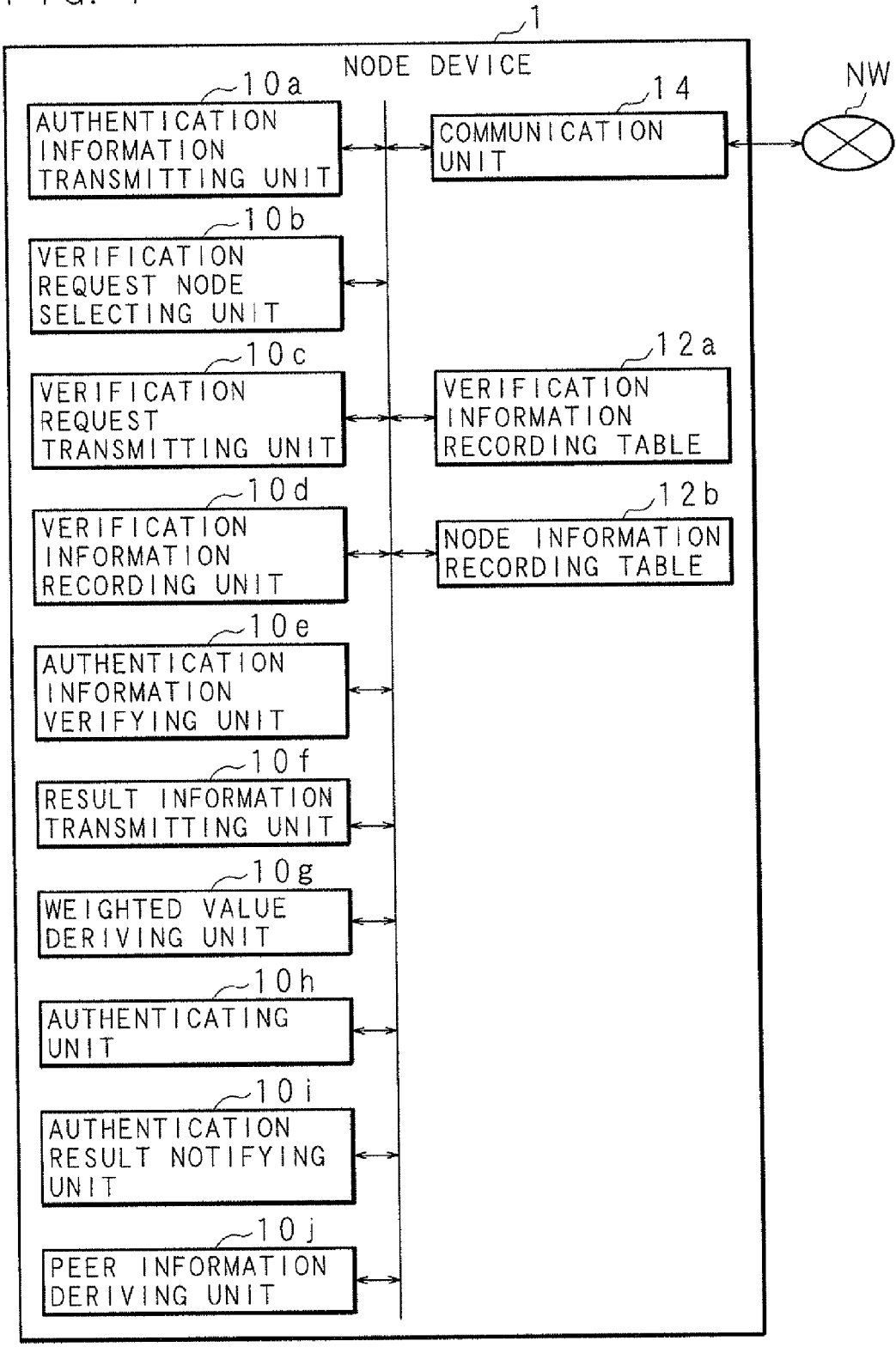
FIG. 4 is a functional block diagram illustrating an example of the software of the node device used in the authentication system according to Embodiment 1.

FIG. 4 is a functional block diagram illustrating an example of the software of the node device 1 used in the authentication system according to Embodiment 1. The node device 1 executes the program 100 under the control of the controller 10, thereby attaining various functions provided by various kinds of program modules, such as an authentication information transmitting unit 10a, a verification request node selecting unit 10b, a verification request transmitting unit 10c, a verification information recording unit 10d, an authentication information verifying unit 10e, a result information transmitting unit 10f, a weighted value deriving unit 10g, an authenticating unit 10h, an authentication result notifying unit 10i and a peer information deriving unit 10j.

The authentication information transmitting unit 10a is a program module that is used when the node device 1 requesting authentication transmits authentication information. The verification request selecting unit 10b is a program module that is used when the node device 1 performing authentication in response to a request selects a plurality of node devices 1, 1, . . . that are requested to verify the validity of the authentication information. The verification request transmitting unit 10c is a program module that is used when the node device 1 performing authentication requests the transmission of the authentication information to the selected plurality of node devices 1, 1 . . . . The verification information recording unit 10d is a program module that is used to record the verification information delivered form the administrative node device 2. The authentication information verifying unit 10e is a program module that is used when the node device 1 requested to perform verification verifies the validity of the authentication information on the basis of the authentication information and the verification information. The result information transmitting unit 10f is a program module that is used when the node device 1 requested to perform verification transmits result information indicating the result of the verification. The weighted value deriving unit 10g is a program module that is used when the node device 1 performing authentication derives the weighted value indicating the reliability of the verification of the respective node devices 1, 1, . . . having performed verification. The authenticating unit 10h is a program module that is used when the node device 1 performing authentication authenticates the node device 1 having requested authentication on the basis of the result information and the weighted value. The authentication result notifying unit 10i is a program module that is used to notify the authentication result and information relating to the authentication to the other devices. The peer information deriving unit 10j is a program module that is used when the node device 1 performing authentication derives the node ID and the peer information based on the hash function.

Moreover, the node device 1 executes the computer program 100 under the control of the controller 10, thereby using part of the recording area of the recording unit 12 as various tables, such as a verification information recording table 12a and a node information recording table 12b. The verification information recording table 12a is a table in which the verification information is recorded so as to be associated with the node IDs of the other node devices 1, 1, . . . The node information recording table 12b is a table in which various kinds of information relating to the respective node devices 1, 1, . . . are recorded.

FIG. 5 is a conceptual view illustrating examples of recorded contents in the node information recording table 12b of the node device 1 used in the authentication system according to Embodiment 1. In the node information recording table 12b, various data items, such as the IP address, port number, node ID, peer information, the amount of traffic, the number of verification times and the degree of contribution to P2P, relating to the other node devices 1, 1, . . . are recorded as a record so as to associated with one another.

The peer information is information indicating the position of each node device in a logical space derived on the basis of the node ID and the hash function. The amount of traffic is the total amount of data traffic of files transmitted to and received from the node device 1 relating to the record. The number of verification times is a number of times in which verification was requested for the node device 1 relating to the record and valid result information was returned. The degree of contribution to P2P is an index value calculated using a predetermined method based on the factors of the processing relating to P2P, such as the amount of traffic, the number of verification times and the number of times in which the authentication information was judged valid by verification. The degree of contribution to P2P can be set by additionally using various factors, such as the number of times in which files were provided for the node device itself, in addition to the factors, such as the amount of data traffic and the number of verification times.

Figure 6:
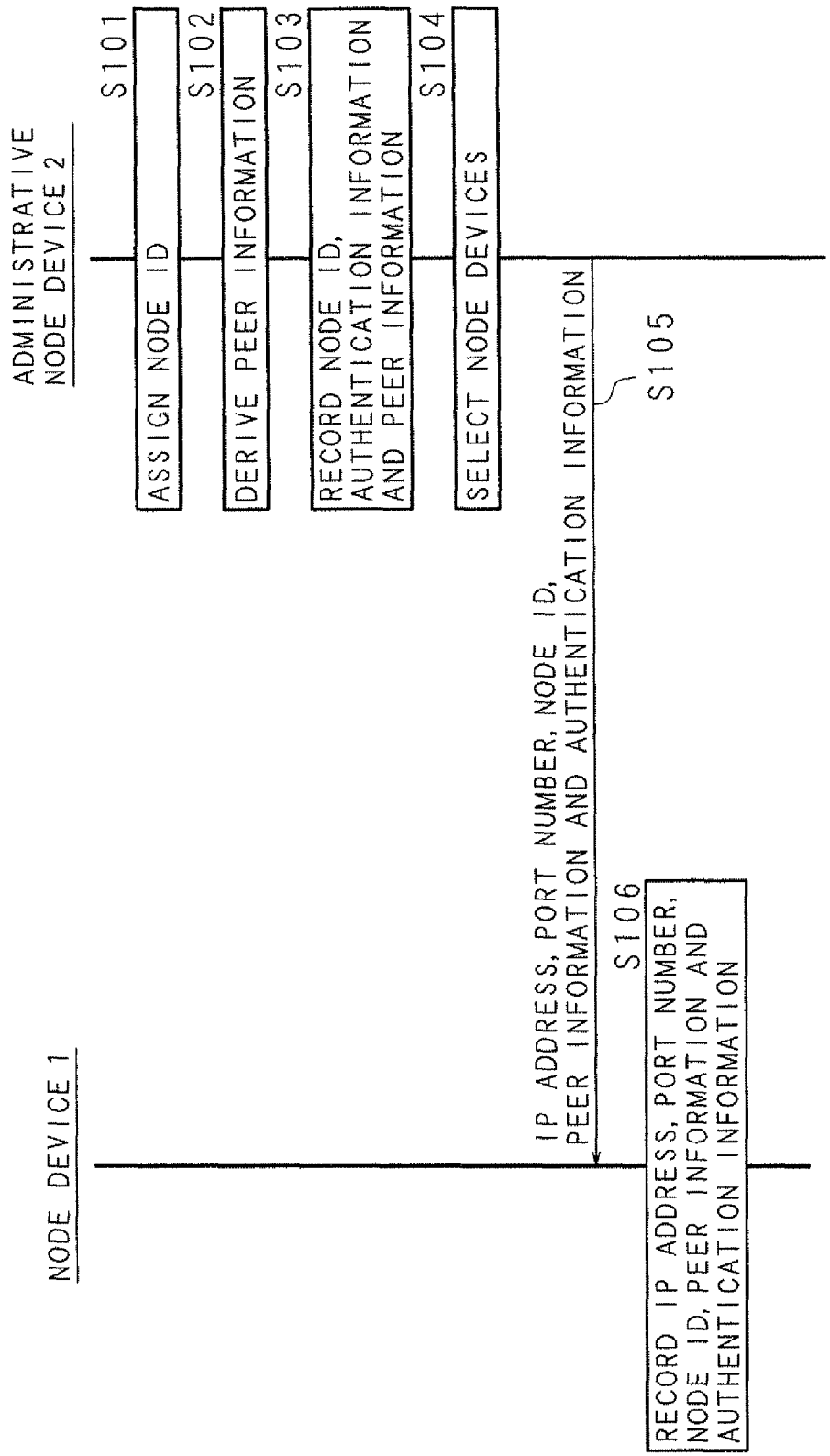
FIG. 6 is a sequence diagram illustrating an example of authentication information delivery processing of the various kinds of devices used in the authentication system according to Embodiment 1.

Next, the processing performed by the various kinds of devices will be described below. FIG. 6 is a sequence diagram illustrating an example of authentication information delivery processing of the various kinds of devices used in the authentication system according to Embodiment 1. One node device 1 connected to the communication network NW transmits its IP address and its authentication information from the communication unit 14 to the administrative node device 2 via the communication network NW under the control of the controller 10.

After receiving the IP address and the authentication information from the one node device 1, the administrative node device 2 assigns a node ID to the one node device 1 (at the operation S101), derives peer information on the basis of the assigned node ID and the hash function SHA−1 (at the operation S102), records the node ID, the authentication information and the peer information in the node table 21a (at the operation S103) under the control of the controller 20. Furthermore, the administrative node device 2 transmits the assigned node ID and the peer information from the communication unit 23 to the one node device 1 via the communication network NW, and the one node device 1 sets the received node ID and the received peer information as its node ID and its peer information.

Furthermore, the administrative node device 2 selects the other plurality of node devices 1, 1, . . . , to which peer information indicating positions close to the position in the logical space indicated by the information relating to the one node device 1 and derived from the node ID of the one node device 1 is assigned, as the destinations of the authentication information of the one node device 1 according to the following Expression (2) under the control of the controller 20 (at the operation S104).

$$HA+\alpha = SHA-1(IDA+\alpha) \quad \text{Expression (2)}$$

where HA+α is information relating to the node device A, IDA is the node ID of the node device A, SHA−1( ) is a hash function, and α is a constant.

At the operation S104, the administrative node device 2 calculates the distances between the position in the logical space indicated by the peer information of the one node device 1 and the positions in the logical space indicated by the peer information of all the other node devices 1, 1, . . . and recorded in the node table 21a. The distance between the positions indicated by the peer information can be calculated as the exclusive OR of two pieces of the peer information. The administrative node device 2 selects a predetermined number of the node devices 1, 1, . . . in increasing order of the calculated distances and/or the node devices 1, 1, . . . , the distances between the positions indicated by the peer information of which are not more than a predetermined value. The information relating to the one node device 1 obtained according to Expression (2) is position information indicating a position in the logical space being dimensionally the same as the position indicated by the peer information. When the selection is performed at step S014, the selection may be performed on the basis of the distance from the position indicated by the peer information of the one node device 1.

Then, the administrative node device 2 transmits the IP address, the port number, the node ID, the peer information and the authentication information of the one node device 1 to the other selected plurality of node devices 1, 1, . . . from the communication unit 23 via the communication network NW under the control of the controller 20 (at the operation S105). The authentication information is transmitted as the verification information of the one node device 1. Furthermore, since the peer information can be derived from the node ID, the transmission of the peer information can be omitted.

Another node device 1 having received the IP address, the port number, the node ID, the peer information and the verification information (authentication information) records the received node ID and the received verification information as a record in which they are associated with each other in the verification information recording table 12a and also records the IP address, the port number, the node ID and the peer information as a record in which they are associated with one another in the node information recording table 12b by virtue of the processing of the verification information recording unit 10d on the basis of the control of the controller 10 (at the operation S106). In this way, authentication information delivery processing is executed. The processing for delivering the verification information of the one node device 1 to the other plurality of node devices 1, 1, . . . located at positions close to the position in the logical space indicated by the information relating to the one node device 1 is not limited to the above-mentioned processing. Information to be transmitted and received, the timing of the processing, the order of the processing, etc. may be set appropriately. Furthermore, other technologies relating to P2P may also be used for the processing. For example, the administrative node device 2 may transmit the node ID or the peer information of the one node device 1 at the operation S105, and in the case that the other node device 1 satisfies a predetermined condition in which the distance between the position indicated by its peer information and the position indicated by the peer information of the one node device 1 is not more than a predetermined value, for example, the other node device 1 itself is closest to the one node device 1, in reference to past communication history, the other node device 1 may request the administrative node device 2 to transmit the authentication information.

Figure 7:
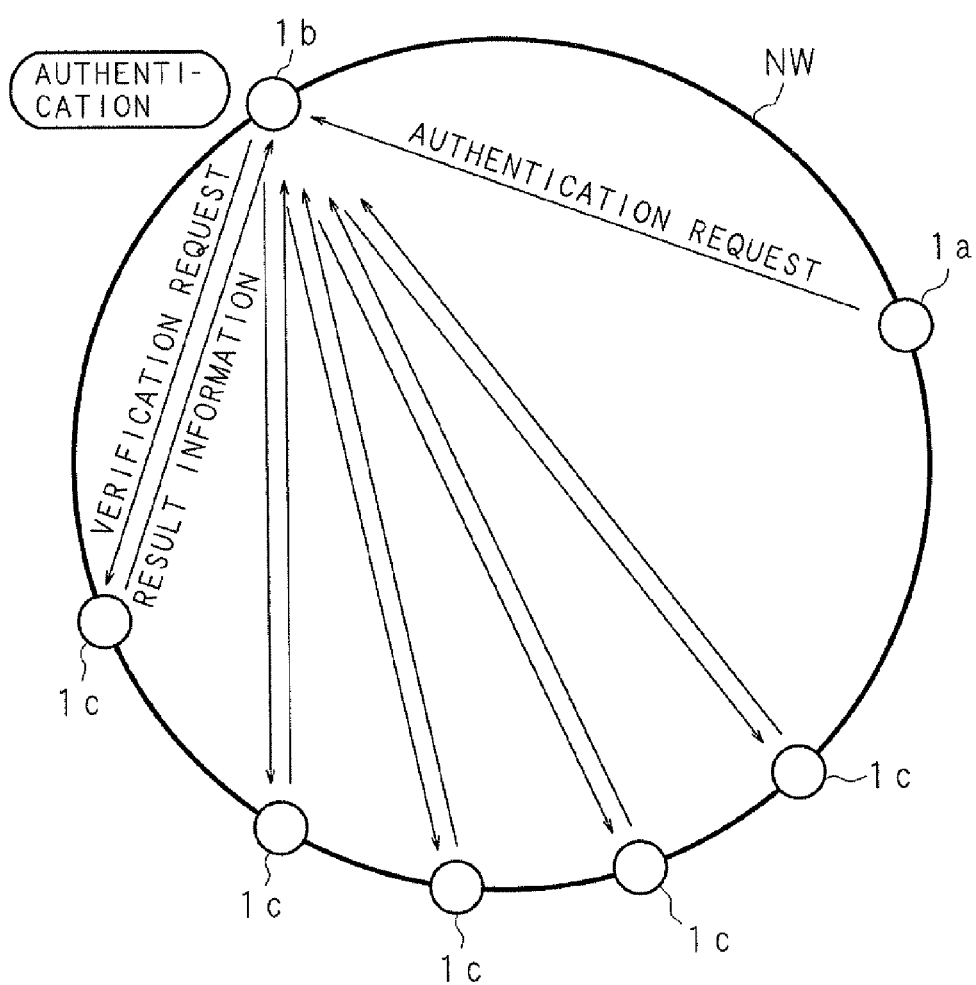
FIG. 7 is a view illustrating the outline of the authentication processing of the authentication system according to Embodiment 1.

FIG. 7 is a view illustrating the outline of the authentication processing of the authentication system according to Embodiment 1. In the authentication processing, a first node device 1 (hereafter referred to as an object node 1a) requests a second node device 1 (hereafter referred to as an authentication node 1b) to perform authentication by transmitting its authentication information thereto. The authentication node 1b requests a plurality of third node devices 1, 1, ... (hereafter referred to as verification nodes 1c, 1c, ... ) selected by the predetermined method to verify the authentication information. The verification nodes 1c, 1c, ... each verify the authentication information and transmit result information indicating the results of the verification to the authentication node 1b. The authentication node 1b judges whether the authentication is valid on the basis of the results of the verification indicated by the result information. The authentication processing is executed, for example, as preprocessing that is performed in the case that the object node 1a requests the authentication node 1b to perform communication processing, such as file transmission.

Figure 8:
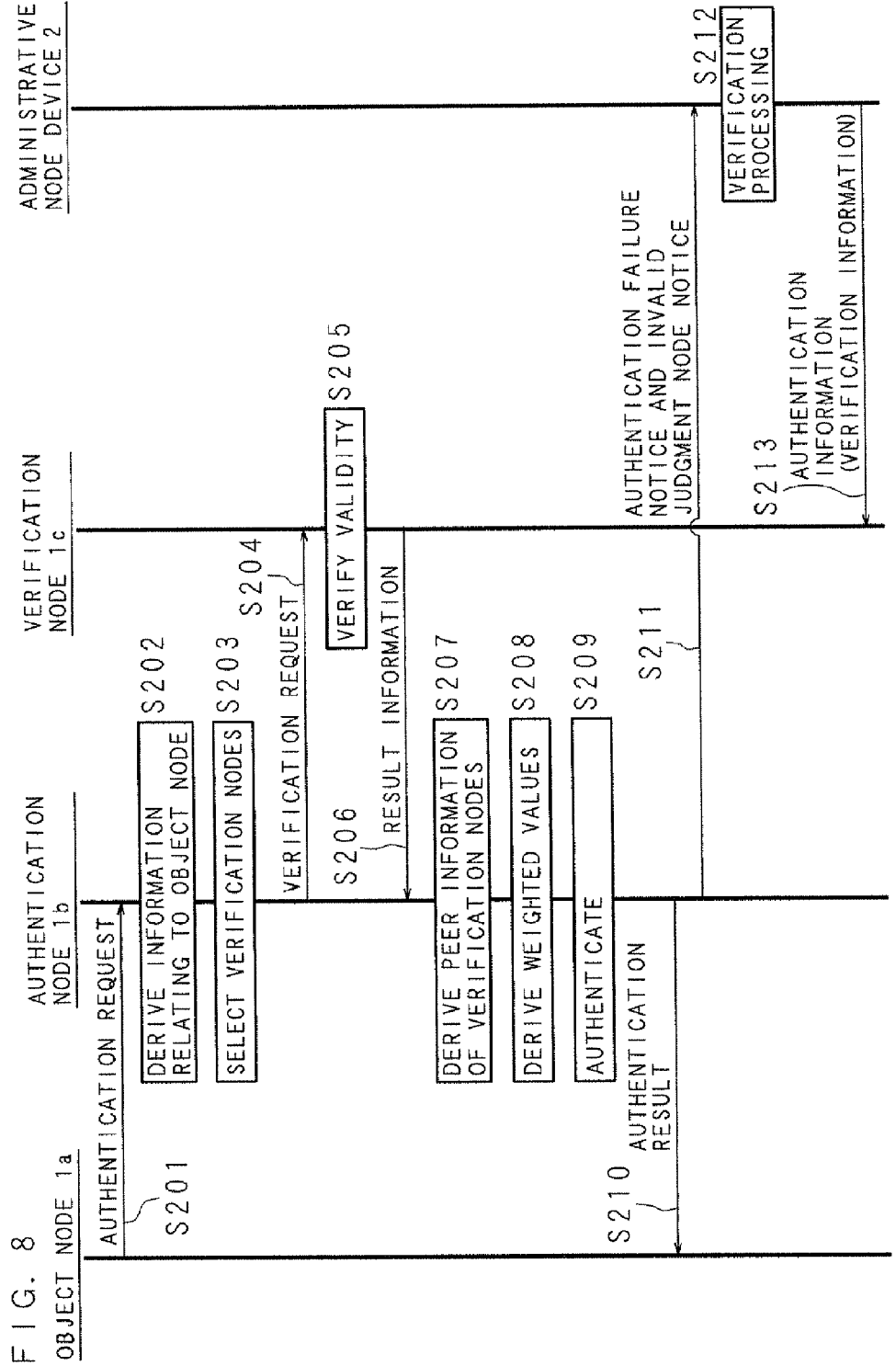
FIG. 8 is a sequence diagram illustrating an example of authentication processing of the various kinds of devices used in the authentication system according to Embodiment 1.

FIG. 8 is a sequence diagram illustrating an example of authentication processing of the various kinds of devices used in the authentication system according to Embodiment 1. The object node 1a transmits an authentication request including its node ID and its authentication information from the communication unit 14 to the authentication node 1b via the communication network NW by virtue of the processing of the authentication information transmitting unit 10a on the basis of the control of the controller 10 for executing the computer program 100 (at the operation S201).

By the processing of the peer information deriving unit 10j on the basis of the control of the controller 10 for executing the computer program 100, the authentication node 1b having received the authentication request derives information relating to the peer information and the object node 1a on the basis of the received node ID of the object node 1a and a prerecorded predetermined hash function (at the operation S202).

By virtue of the processing of the verification request node selecting unit 10b on the basis of the control of the controller 10, the authentication node 1b selects a plurality of the node devices 1, 1, ... provided with peer information indicating their positions close to the position in the logical space indicated by the information relating to the object node 1a and derived at the operation S202 as the verification nodes 1c, 1c, ... that are requested to perform the verification of the authentication information (at the operation S203).

At the operation S203, the authentication node 1b calculates the distances between the position in the logical space indicated by the information relating to the object node 1a and the positions in the logical space indicated by the peer information of the other node devices 1, 1, ... and recorded in the node information recording table 12b. Then, the authentication node 1b selects a predetermined number of the node devices 1, 1, ... in increasing order of the calculated distances and/or the node devices 1, 1, ..., the distances between the positions indicated by the peer information of which are not more than a predetermined value, as verification nodes 1c, 1c, .... In the case that the node devices 1, 1, ... in which the verification information of the object node 1a is recorded is known in reference to the past communication, from among the node devices 1, 1, ..., the node devices 1, 1, ... close to the position of the object node 1a are selected as verification nodes 1c, 1c, ....

By the processing of the verification request transmitting unit 10c on the basis of the control of the controller 10, the authentication node 1b transmits a verification request for requesting the verification of the validity of the authentication information of the object node 1a from the communication unit 14 to the verification nodes 1c, 1c, ... selected at the operation S203 via the communication network NW (at the operation S204). The verification request transmitted at the operation S204 includes information, such as the node ID of the object node 1a, the node ID of the authentication node 1b and the authentication information of the object node 1a.

By the processing of the authentication information verifying unit 10e on the basis of the control of the controller 10 for executing the computer program 100, the verification node 1c having received the verification request verifies the validity of the authentication information of the authentication node 1b on the basis of the authentication information included in the received verification request and the verification information recorded in the verification information recording table 12a (at the operation S205). At the operation S205, the verification information recorded so as to be associated with the node ID of the object node 1a included in the received verification request is extracted from the verification information recording table 12a. Then, the extracted verification information is compared with the authentication information included in the received verification information, whereby the validity of the authentication information is verified. In the case that the verification information associated with the node ID of the object node 1a included in the verification information is not recorded in the verification information recording table 12a, the verification node 1c outputs a verification result indicating that the authentication information is invalid.

Then, by the processing of the result information transmitting unit 10f on the basis of the control of the controller 10, the verification node 1c transmits result information indicating the result of the verification from the communication unit 14 to the authentication node 1b via the communication network NW (at the operation S206). The result information transmitted at the operation S206 includes information, such as the node ID of the object node 1a, the verification result and the node ID of the verification node 1c.

By the processing of the peer information deriving unit 10j on the basis of the control of the controller 10, the authentication node 1b having received the result information from the each of verification nodes 1c, 1c, ... derives the peer information of the each of verification nodes 1c, 1c, ... on the basis of the node IDs included in the each result information and a prerecorded predetermined hash function (at the operation S207). Since a hash function similar to the hash function used by the administrative node device 2 is used at the operation S207, the authentication node 1b derives values similar to those of the peer information derived by the administrative node device 2.

By the processing of the weighted value deriving unit 10g on the basis of the control of the controller 10, the authentication node 1b derives weighted values indicating the reliability of the respective verification results (at the operation S208).

The weighted values derived at the operation S208 will be described below. The authentication node 1b rearranges the each of verification nodes 1c, 1c, ... in the descending order of reliability and derives the weighted values of the each of verification nodes 1c, 1c, ... so that the weighted value becomes larger as the reliability is higher. The level of the reliability is determined on the basis of the peer information derived at the operation S208 and/or the degree of contribution to P2P recorded in the node information recording table 12b. For example, the reliability of the each of verification nodes 1c, 1c, ... becomes higher as the position in the logical space indicated by the derived peer information is closer to the position indicated by the information relating to the object node 1a. This is because it may be estimated that the reliability of each of the verification nodes $1c$, $1c$, ... located at a position in the logical space closer to the position indicated by the information relating to the object node $1a$ is high on the premise that newer peer information has been delivered from the administrative node device 2 to the verification node $1c$. In addition, the reliability of the each of verification nodes $1c$, $1c$, ... becomes higher as the degree of contribution to P2P recorded in the node information recording table $12b$ is higher. This is because it may be estimated that the verification node $1c$ having a high degree of contribution to P2P is high in reliability according to the past history of the verification. Furthermore, the reliability of the each of verification nodes $1c$, $1c$, ... can be derived by predetermined methods that are used to obtain the addition, average, etc. of the value indicating the reliability obtained by the peer information and the value indicating the reliability obtained by the degree of contribution to P2P.

FIG. 9 is a table illustrating examples of the weighted values derived by the authentication node $1b$ used in the authentication system according to Embodiment 1. The table illustrated in FIG. 9 provides an example of the relationship between the order of reliability and each weighted value. Example 1 in FIG. 9 indicates that 0.5 is derived as the weighted value of the verification node $1c$ having the first level of reliability, i.e., the highest reliability, and that 0.25 is derived as the weighted values of the verification node $1c$ having the second level of reliability and the verification node $1c$ having the third level of reliability. In Example 1, the weighted values of the verification nodes $1c$, $1c$, ... having the fourth and lower levels of reliability are 0. Example 2 in FIG. 9 indicates that 0.5 is derived as the weighted values of the verification node $1c$ having the first level of reliability and the verification node $1c$ having the second level of reliability. In Example 2, the weighted values of the verification nodes $1c$, $1c$, ... having the third and lower levels of reliability are 0. Example 3 in FIG. 9 indicates that 0.4, 0.3, 0.2 and 0.1 are derived as the weighted values of the verification nodes having the first to fourth levels of reliability in the decreasing order, respectively. The weighted values listed in FIG. 9 are merely used as examples, and the weighted values can be set appropriately depending on factors, such as the object, specifications, etc. of the authentication system.

Returning to the sequence diagram, the authentication node $1b$ authenticates the object node $1a$ on the basis of the each verification result included in the result information received from the plurality of verification nodes $1c$, $1c$, ... and the derived weighted values of the each of verification nodes $1c$, $1c$, ... by the processing of the authenticating unit $10h$ on the basis of the control of the controller 10 (at the operation S209). At the operation S209, the authentication node $1b$ assigns a point value of 1 to the verification nodes $1c$, $1c$, ... having judged that the object node $1a$ is valid, assigns a point value of 0 to the verification nodes $1c$, $1c$, ... having judged that the object node $1a$ is invalid, multiplies the each point values by the weighted values, and adds the obtained values. In other words, the authentication node $1b$ adds the weighted values corresponding to the verification nodes $1c$, $1c$, ... having judged that the object node $1a$ is valid. In the case that the total addition value is a predetermined value, for example, a preset value of 0.5 or 0.6, or larger, the authentication node $1b$ determines that the object node $1a$ is valid and judges that the authentication has succeeded. In the case that the total addition value is less than the predetermined value, the authentication node $1b$ judges that the authentication has failed.

By the processing of the authentication result notifying unit $10i$ on the basis of the control of the controller 10, the authentication node $1b$ transmits the authentication result from the communication unit 14 to the object node $1a$ via the communication network NW (at the operation S210). The authentication result transmitted at the operation S210 includes information, such as the node ID of the object node $1a$, the authentication result indicating that the authentication has succeeded/failed and the node ID of the authentication node $1b$. When the authentication has succeeded, the authentication node $1b$ performs communication processing, such as file transmission, to the object node $1a$.

Furthermore, by the processing of the authentication result notifying unit $10i$ on the basis of the control of the controller 10, the authentication node $1b$ transmits an authentication failure notice indicating the node ID of the object node $1a$ when the authentication has been judged failed and an invalid judgment node notice indicating the node IDs of the verification nodes $1c$, $1c$, ... having judged that the authentication information is not valid from the communication unit 14 to the administrative node device 2 via the communication network NW (at the operation S211). The authentication failure notice transmitted at the operation S211 includes information, such as the node ID of the object node $1a$, the authentication result indicating the success/failure of the authentication and the node ID of the authentication node $1b$. Moreover, the invalid judgment node notice includes information, such as the node ID of the object node $1a$, the verification result and the node ID of the verification node $1c$ having judged that the authentication has failed. When the authentication is judged to have succeeded, the authentication failure notice is not transmitted. However, the invalid judgment node notice is transmitted regardless of the authentication result. When all the verification results recognize the validity of the object node $1a$, the operation S211 and the following steps are not performed. Furthermore, the authentication node $1b$ renews the node information recording table $12b$ on the basis of the result of the authentication. At the operation S211, in the case that the authentication has failed and that the number of the verification nodes $1c$, $1c$, ... having returned result information indicating that the authentication information has been judged invalid is large, it may be possible that the verification nodes $1c$, $1c$, ... having judged that the authentication information is valid are invalid. Hence, in this case, it is assumed that the verification nodes $1c$, $1c$, ... having returned the result information indicating that the authentication information is valid although the authentication information is not valid are the verification nodes $1c$, $1c$, ... having judged that the authentication information is not valid.

Under the control of the controller 20, the administrative node device 2 having received the authentication failure notice and the invalid judgment node notice executes verification processing to verify the node IDs of the object node $1a$ and the verification nodes $1c$, $1c$, ... having been notified (at the operation S212). The verification processing at the operation S212 is processing for judging the validity of the object node $1a$ and the verification nodes $1c$, $1c$, ... having been notified and for taking countermeasures. When the administrative node device 2 judges that the object node $1a$ is invalid in the verification processing, the administrative node device 2 executes predetermined countermeasures for invalid nodes, such as the registration of the object node $1a$ in an invalid node list (black list). Furthermore, when the administrative node device 2 judges that the verification nodes $1c$, $1c$, ... are invalid, the administrative node device 2 executes the predetermined countermeasures for invalid nodes, that is, the verification nodes $1c$, $1c$, ... having been judged invalid.

When the notified object node $1a$ is judged valid in the verification processing at the operation S212 and when valid nodes are included in the notified verification nodes 1c, 1c, . . . , the administrative node device 2 redelivers the authentication information (verification information) of the object node 1a to the valid verification nodes 1c, 1c, . . . from the communication unit 23 via the communication network NW (at the operation S213). The redelivery of the verification information at the operation S213 is processing performed on the basis of the assumption that the verification nodes 1c, 1c, . . . have recorded old verification information. When the administrative node device 2 judges that the object node 1a is invalid or when the administrative node device 2 judges that valid nodes are not included in the notified verification nodes 1c, 1c, . . . , the redelivery processing at step S213 is not executed. In this way, the authentication processing is executed.

In the present embodiment, since the authentication is performed between the node devices, the processing load of a specific administrative node device does not increase. Furthermore, in the present embodiment, even if the verification results are not coincident, the authentication is performed by additionally considering reliability. For this reason, the accuracy of the authentication can be made higher than that obtained by mere majority decision.

In the present embodiment, on the premise that newer verification information has been recorded as the distance in the logical space is shorter, the weighted value of a node device that is estimated to have new verification information and high reliability is made high, whereby the accuracy of the authentication may be improved. Furthermore, in the present embodiment, the accuracy of the authentication may also be improved by additionally considering the practical accomplishment of the degree of contribution to P2P, such as the number of times in which the third node devices performed verification in the past and the past communication results.

In the present embodiment, when the verification results indicated by plural pieces of received result information do not coincide with one another, the second node device judges whether the weighted value derived for each third node device having judged that the authentication information is not valid is a predetermined value or more. When the second node device judges that the weighted value is the predetermined value or more, the second node device transmits the information indicating the third node device relating to the weighted value to the administrative node device.

Hence, the third node device having judged that the authentication information is not valid is assumed to be a node device having a high possibility of being invalid, for example, and is administered by the administrative node device. However, since only the node devices assumed to have high reliability are considered to be important and administered, no notice is given to node devices that are highly likely to have old verification information and are low in reliability, for example. As a result, the processing load of the administrative node device may be suppressed from increasing.

Embodiment 2

In Embodiment 2, verification nodes in which verification is requested in the authentication processing according to Embodiment 1 are narrowed down. In the following descriptions, hardware components similar to those of Embodiment 1 are designated by reference codes similar to those of Embodiment 1. Since examples of an authentication system and various kinds of devices according to Embodiment 2 are similar to those according to Embodiment 1, the descriptions in Embodiment 1 are supposed to be referenced and their descriptions are omitted. In addition, since the authentication information delivery processing of the authentication system according to Embodiment 2 is similar to that according to Embodiment 1, the descriptions in Embodiment 1 are supposed to be referenced and their descriptions are omitted.

Figure 10:
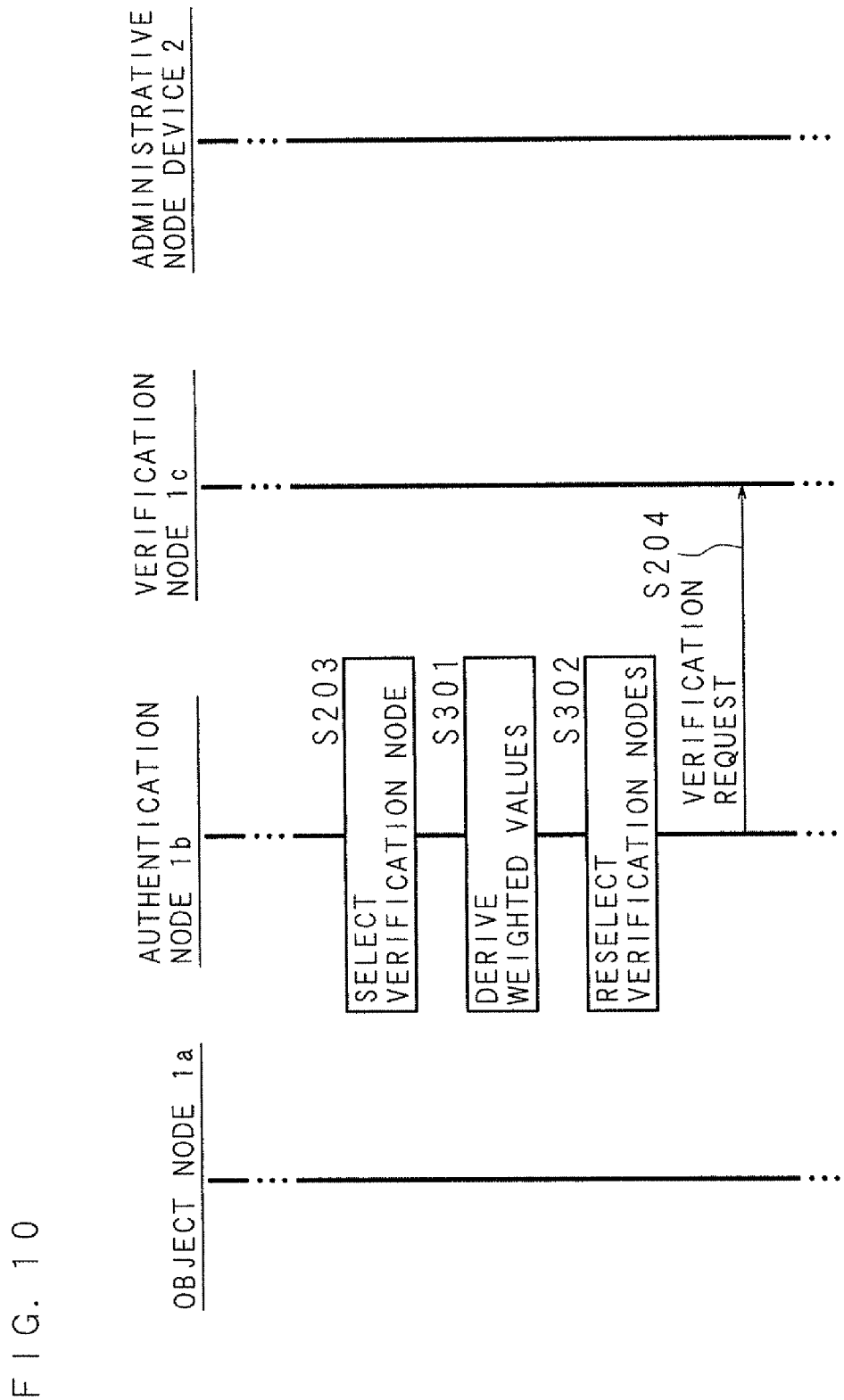
FIG. 10 is a sequence diagram illustrating an example of authentication processing in the various kinds of devices used in the authentication system according to Embodiment 2.

FIG. 10 is a sequence diagram illustrating an example of authentication processing in the various kinds of devices used in the authentication system according to Embodiment 2. The object node 1a and the authentication node 1b execute processing ranging from the transmission of authentication information to the selection of the verification nodes 1c, 1c, . . . in a way similar to the operations S201 to S203 of the authentication processing of Embodiment 1.

By the processing of the weighted value deriving unit 10g on the basis of the control of the controller 10 for executing the computer program 100, the authentication node 1b derives weighted values indicating the reliability of the verification of the selected verification nodes 1c, 1c, . . . (at the operation S301). The derivation of the weighted values at the operation S301 is substantially similar to the derivation of the weighted values at the operation S207 of the authentication processing in Embodiment 1. However, it may be possible that significant weighted values larger than 0 are derived for more number of the verification nodes 1c, 1c, . . . than that in the example of the table illustrated in FIG. 9.

By the processing of the verification request node selecting unit 10b on the basis of the control of the controller 10 and on the basis of the derived weighted values, the authentication node 1b reselects a plurality of verification nodes 1c, 1c, . . . , that are requested to verify the validity of the authentication information, from among the verification nodes 1c, 1c, . . . from which the weighted values are derived (at the operation S302). At the operation S302, a predetermined number of verification nodes 1c, 1c, . . . having weighted values of a predetermined value or more or having high weighted values in the descending order are selected, whereby the verification nodes 1c, 1c, . . . first selected are narrowed down.

Then, the authentication node 1b and the verification nodes 1c, 1c, . . . execute the operation S204 and the following operations of the authentication processing of Embodiment 1. In this way, the authentication processing is executed.

Embodiment 3

In Embodiment 3, the authentication node having performed the authentication processing notifies the node IDs of only the verification nodes having high weighted values among the verification nodes having judged that the authentication information is not valid to the administrative node device. In the following descriptions, hardware components similar to those of Embodiment 1 are designated by reference codes similar to those of Embodiment 1. Since examples of an authentication system and various kinds of devices according to Embodiment 3 are similar to those according to Embodiment 1, the descriptions in Embodiment 1 are supposed to be referenced and their descriptions are omitted. In addition, since the authentication information delivery processing of the authentication system according to Embodiment 3 is similar to that according to Embodiment 1, the descriptions in Embodiment 1 are supposed to be referenced and their descriptions are omitted.

Figure 11:
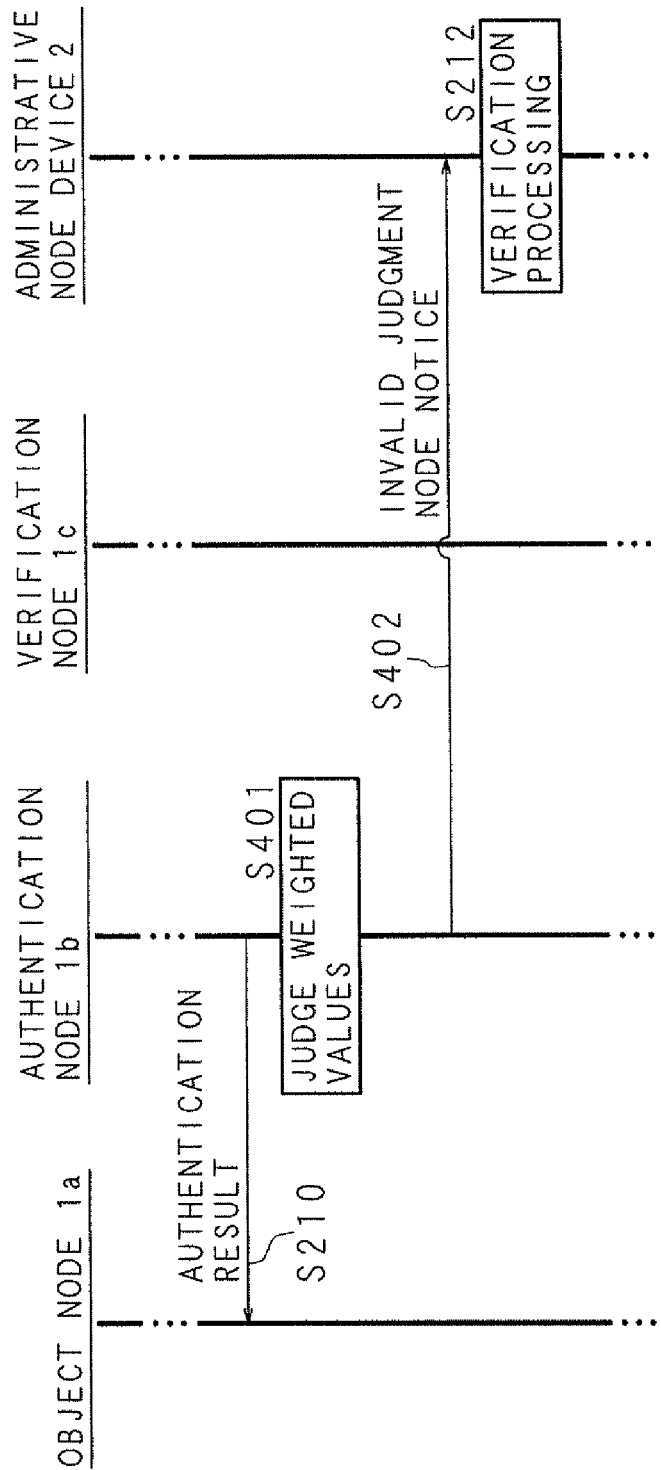
FIG. 11 is a sequence diagram illustrating an example of authentication processing in the various kinds of devices used in the authentication system according to Embodiment 3.

FIG. 11 is a sequence diagram illustrating an example of authentication processing in the various kinds of devices used in the authentication system according to Embodiment 3. The object node 1a, the authentication node 1b and the verification nodes 1c, 1c, . . . execute processing ranging from the transmission of the authentication information to the transmission of the authentication result in a way similar to the operations S201 to S210 of the authentication processing of Embodiment 1.

By the processing of the authentication result notifying unit 10*i* on the basis of the control of the controller 10 for executing the computer program 100, the authentication node 1*b* judges whether the weighted values derived for the verification nodes 1*c*, 1*c*, . . . having judged that the authentication information is not valid are a predetermined value, such as 0.5 or 0.3, or more (at the operation S401). As processing to be performed instead of the operation S401, it may be possible that the authentication node 1*b* judges whether the verification nodes 1*c*, 1*c*, . . . are the verification nodes arranged in the descending order of their weighted values and ranked in the range from the highest order to a predetermined order in terms of the weighted values. When all the verification results received by the authentication node 1*b* are coincident with one another, the operation S401 and the following steps are not performed.

By the processing of the authentication result notifying unit 10*i* on the basis of the control of the controller 10, the authentication node 1*b* transmits an invalid judgment node notice from the communication unit 14 to the administrative node device 2 via the communication network NW (at the operation S402). At the operation S402, the invalid judgment node notice includes the node IDs of the verification nodes 1*c*, 1*c*, . . . having weighted values not less than a predetermined value among the verification nodes 1*c*, 1*c*, . . . having judged that the authentication information of the object node 1*a* is not valid, but does not include the node IDs of the verification nodes 1*c*, 1*c*, . . . having weighted values less than the predetermined value.

Then, the authentication node 1*b* and the verification nodes 1*c*, 1*c*, . . . execute the operation S212 and the following operations of the verification processing of Embodiment 1. In Embodiment 3, the transmission of the invalid judgment node notice relating to the verification nodes 1*c*, 1*c*, . . . having low weighted values to the administrative node device 2 is limited, whereby it is possible to reduce the communication load relating to the administrative node device 2 and the processing loads relating to the administrative processing of the administrative node device 2, such as the verification and redelivery,. In this way, the authentication processing is executed.

Embodiment 4

In Embodiment 4, a target node having received an authentication result indicating that authentication has failed requests the administrative node device 2 to redeliver the authentication information (verification information). In the following descriptions, hardware components similar to those of Embodiment 1 are designated by reference codes similar to those of Embodiment 1. Since examples of the hardware components of an authentication system and various kinds of devices according to Embodiment 4 are similar to those according to Embodiment 1, the descriptions in Embodiment 1 are supposed to be referenced and their descriptions are omitted.

Figure 12:
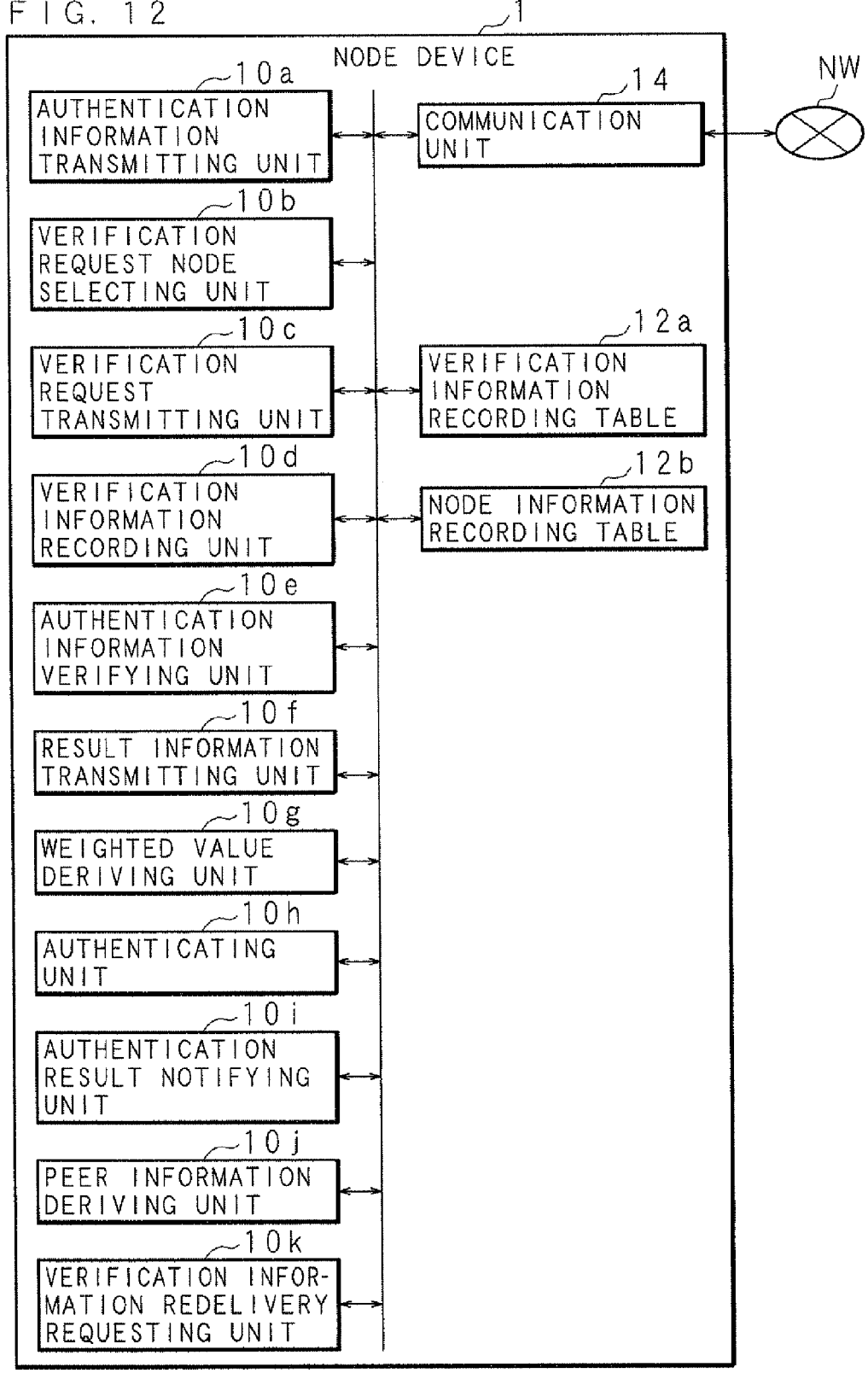
FIG. 12 is a functional block diagram illustrating an example of the software of the node device used in the authentication system according to Embodiment 4.

FIG. 12 is a functional block diagram illustrating an example of the software of the node device 1 used in the authentication system according to Embodiment 4. The node device 1 executes the program 100 under the control of the controller 10, thereby attaining various functions provided by various kinds of program modules, such as an authentication information transmitting unit 10*a*, a verification request selecting unit 10*b*, a verification request transmitting unit 10*c*, a verification information recording unit 10*d*, an authentication information verifying unit 10*e*, a result information transmitting unit 10*f*, a weighted value deriving unit 10*g*, an authenticating unit 10*h*, an authentication result notifying unit 10*i*, a peer information deriving unit 10*j* and a verification information redelivery requesting unit 10*k*. The verification information redelivery requesting unit 10*k* is a program module that is used to request the administrative node device 2 to redeliver the verification information.

Moreover, the node device 1 executes the computer program 100 under the control of the controller 10, thereby using part of the recording area of the recording unit 12 as various tables, such as a verification information recording table 12*a* and a node information recording table 12*b*.

Next, the processing performed by the various kinds of devices according to Embodiment 4 will be described below. Since the authentication information delivery processing and the authentication processing of the authentication system according to Embodiment 4 are similar to those according to Embodiment 1, the descriptions in Embodiment 1 are supposed to be referenced and their descriptions are omitted.

Figure 13:
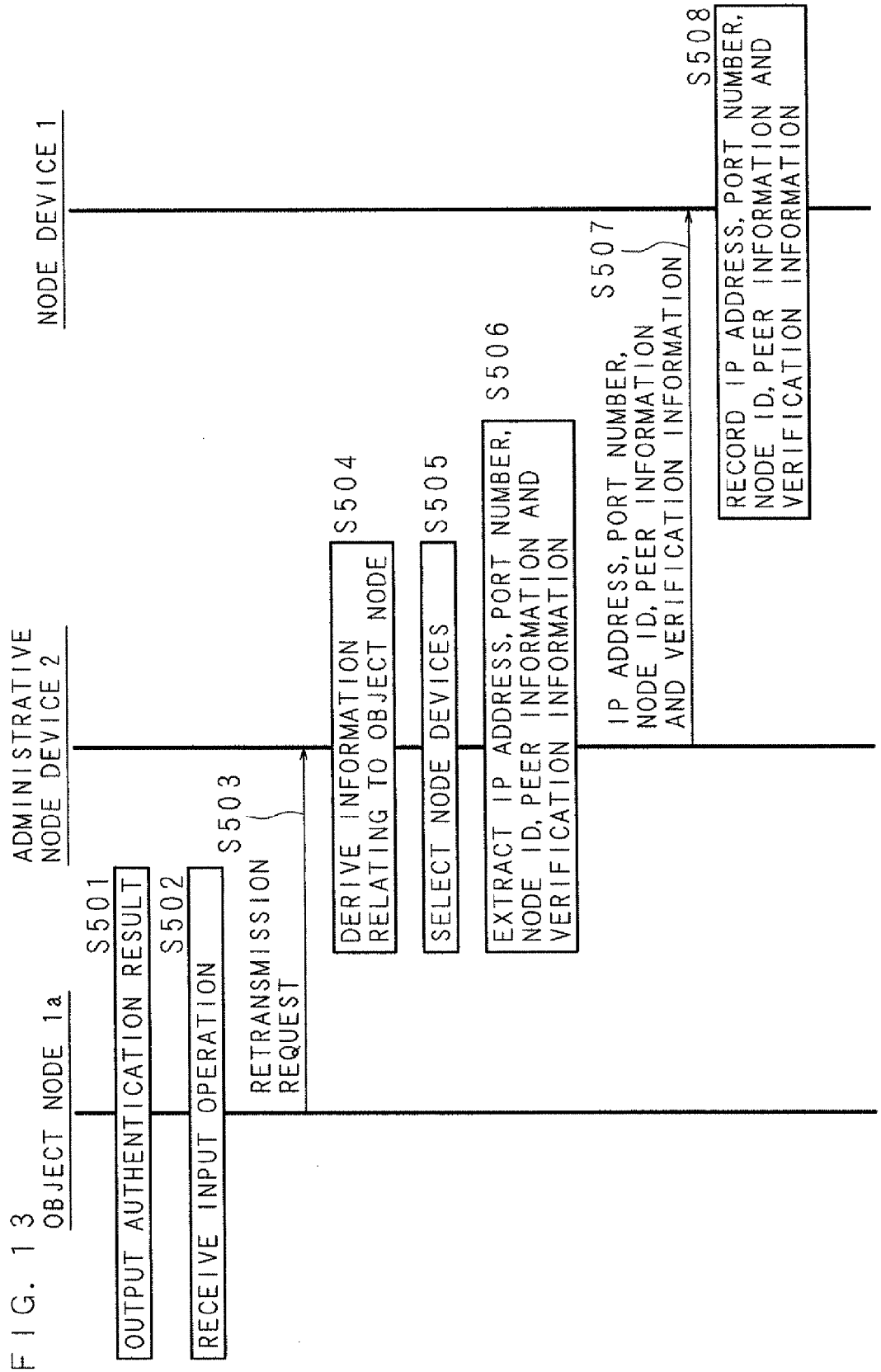
FIG. 13 is a sequence diagram illustrating an example of verification information redelivery processing of the various kinds of devices used in the authentication system according to Embodiment 4.

FIG. 13 is a sequence diagram illustrating an example of verification information redelivery processing of the various kinds of devices used in the authentication system according to Embodiment 4. The authentication node 1*b* transmits the authentication result to the object node 1*a* as indicated at the operation S210 of the authentication processing of Embodiment 1. When the object node 1a that has received the authentication result checks the contents of the authentication result and finds that the authentication has failed, the object node 1*a* executes verification information redelivery processing described below.

By the processing of the verification information redelivery requesting unit 10*k* on the basis of the control of the controller 10 for executing the computer program 100, the object node 1*a* outputs the authentication result indicating that the authentication has failed from the output unit 16, i.e., a monitor (at the operation S501). When user having confirmed the authentication result requests the redelivery of the verification information on the premise that re-authentication is requested, the user performs predetermined input operation using the input unit 15.

By the processing of the verification information redelivery requesting unit 10*k* on the basis of the control of the controller 10 for executing the computer program 100, the object node 1*a* receives the input operation from the input unit 15 (at the operation S502) and transmits a retransmission request for requesting the retransmission of its verification information (authentication information) from the communication unit 14 to the administrative node device 2 via the communication network NW (at the operation S503). The retransmission request to be transmitted at the operation S503 includes information, such as the node ID of the object node 1*a*.

Under the control of the controller 20, the administrative node device 2 having received the retransmission request derives information relating to the object node 1*a* on the basis of the node ID and the hash function SHA-1 included in the received retransmission request (at the operation S504). Then, the administrative node device 2 selects a plurality of node devices 1, 1, . . . , to each of which peer information indicating a position close to the position in the logical space indicated by the derived information relating to the object node 1*a* is assigned, as the destinations of the verification information of the object node 1*a* (at the operation S505).

Under the control of the controller 20, the administrative node device 2 extracts the IP address, port number, node ID, peer information and verification information (authentication information) recorded so as to be associated with the node ID of the object node 1*a* from the node table 21*a* (at the operation S506). Then, the administrative node device 2 transmits the IP address, port number, node ID, peer information and verification information (authentication information) of the object node 1a from the communication unit 23 to the plurality of node devices 1, 1, ... selected at the operation S505 via the communication network NW (at the operation S507).

By the processing of the verification information recording unit 10d on the basis of the control of the controller 10, the node device 1 having received the IP address, port number, node ID, peer information and verification information (authentication information) records the received node ID and the received verification information as a record in which they are associated with each other in the verification information recording table 12a and also records the IP address, port number, node ID and peer information as a record in which they are associated with one another in the node information recording table 12b (at the operation S508).

Then, the administrative node device 2 notifies to the object node 1a that the verification information has been redelivered, and the object node 1a transmits an authentication request again to the authentication node 1b, whereby authentication processing starts. After the peer information (node ID) is assigned to the object node 1a, when a piece of peer information (node ID) indicating a position close to the position indicated by the information relating to the object node 1a is assigned to a node device 1 that is newly connected to the communication network NW, the node device 1 newly connected may be a verification node 1c for verifying the validity of the object node 1a; however, since the verification information of the object node 1a is not recorded in the node device 1, the node device 1 judges that the authentication information of the object node 1a is invalid. The verification information redelivery processing functions effectively in this kind of situation.

In the present embodiment, for example, when authentication has failed, the node device having requested the authentication requests the administrative node device to redeliver the verification information of the node device itself having requested the authentication. Hence, the node device requests the authentication in a new state.

Embodiment 5

In Embodiment 5, the authentication system according to Embodiment 1 is used to complement broadcasting, such as satellite broadcasting. In the following descriptions, hardware components similar to those of Embodiment 1 are designated by reference codes similar to those of Embodiment 1.

Figure 14:
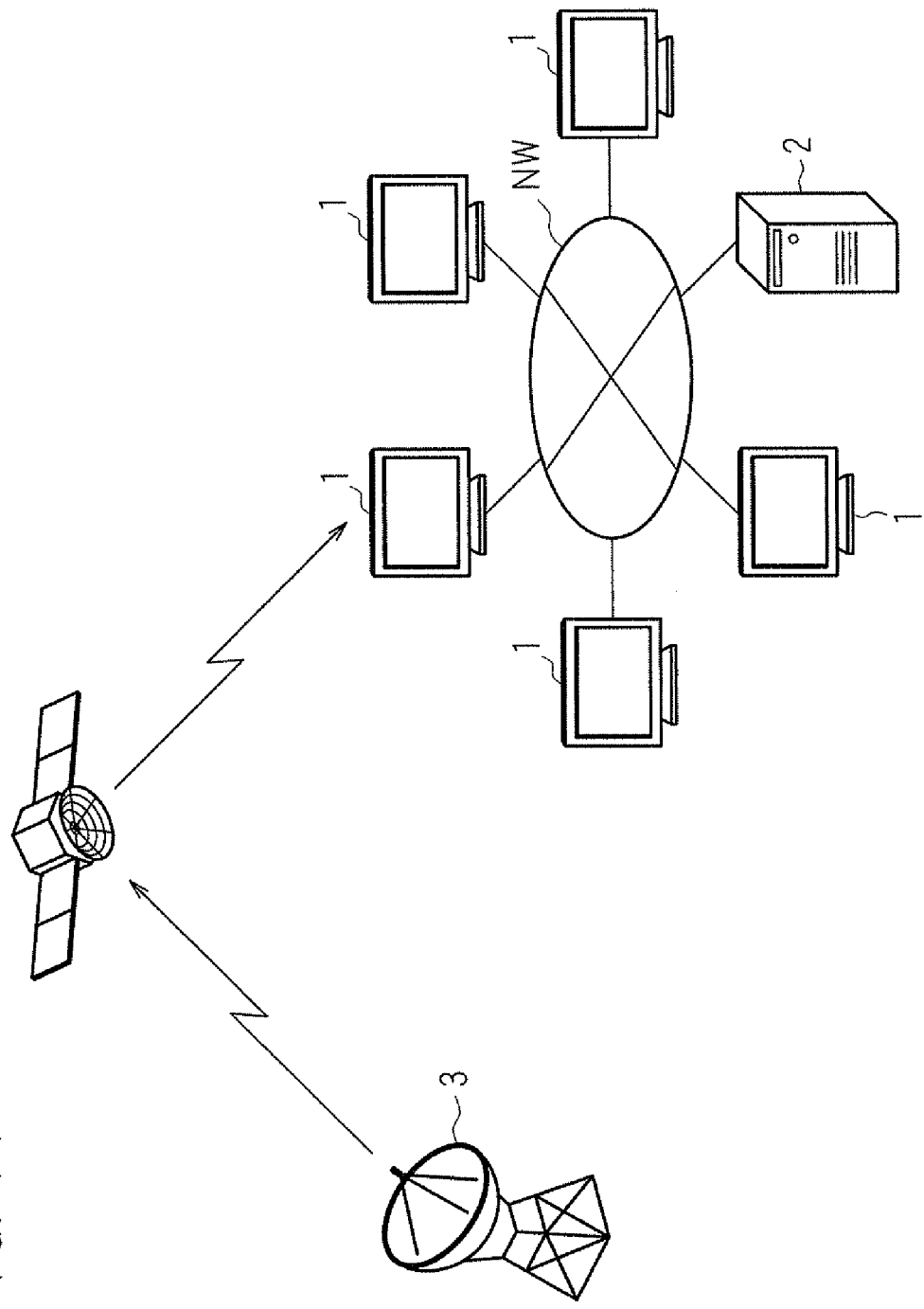
FIG. 14 is a conceptual diagram illustrating an example of an authentication system according to Embodiment 5.

FIG. 14 is a conceptual diagram illustrating an example of an authentication system according to Embodiment 5. Symbol 3 in FIG. 14 designates a broadcast device used in, for example, a ground station for satellite broadcasting or a broadcasting station for terrestrial broadcasting. The broadcast device 3 superimposes broadcasting information serving as contents to be broadcast on a broadcast wave and transmits the broadcast wave to a plurality of node devices 1, 1, ... via relay units such as a broadcasting satellite and relay stations. The node devices 1, 1, ... receive the broadcast wave and performs processing, such as the output of video and audio signals based on the broadcasting information superimposed on the received broadcast wave. Data missing portions in which data has not been received properly occur in some cases in the broadcasting information received by the node device 1 because of various factors, such as rainfall, snowfall and the transmission path switching of the broadcast wave. When such data missing portions are present in the broadcasting information, the node devices 1, 1, ... mutually complement the data missing portions.

Figure 15:
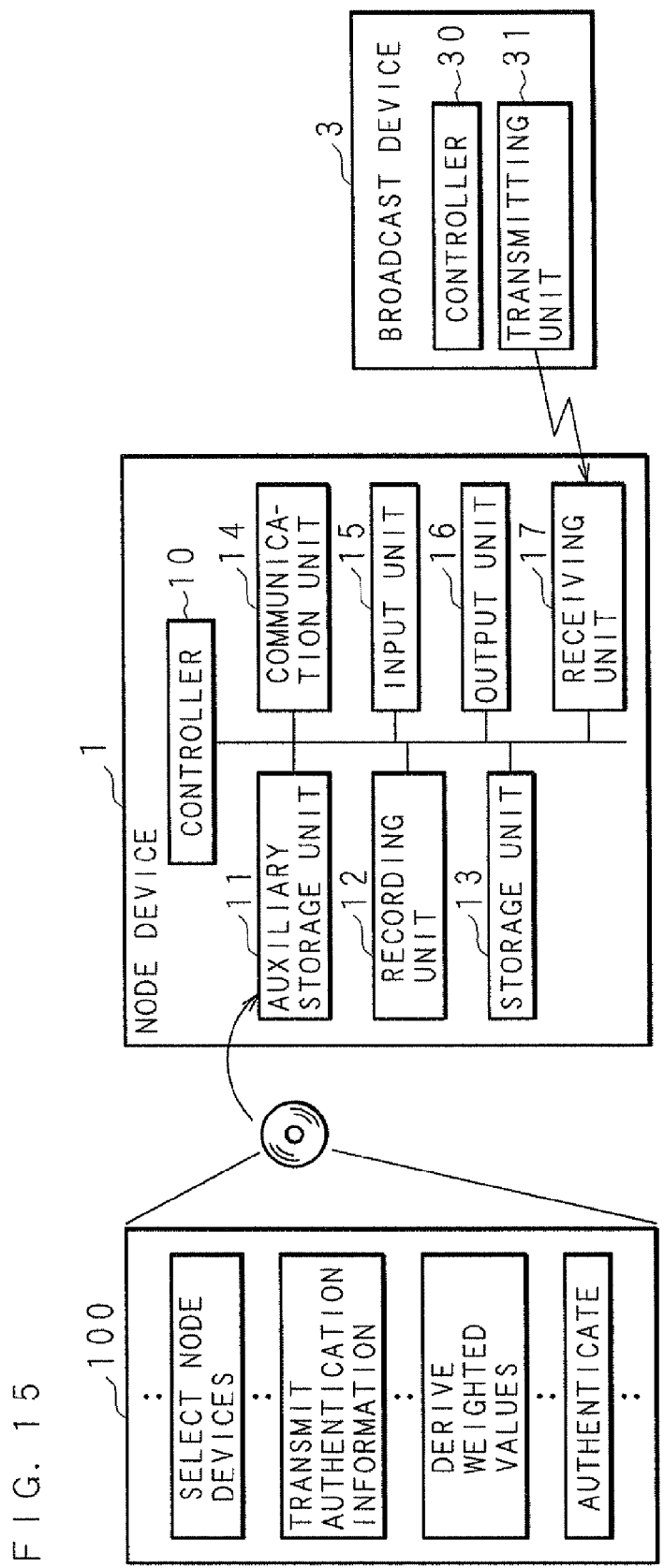
FIG. 15 is a block diagram illustrating an example of the hardware of various devices used for the authentication system according to Embodiment 5.

FIG. 15 is a block diagram illustrating an example of the hardware of various devices used for the authentication system according to Embodiment 5. The node device 1 includes a controller 10, an auxiliary storage unit 11, a recording unit 12, a storage unit 13, a communication unit 14, an input unit 15, an output unit 16 and a receiving unit 17, such as a tuner, and the node device 1 executes the computer program 100. The receiving unit 17 receives a broadcast wave and extracts the broadcasting information from the received broadcast wave.

Since the hardware components of the administrative node device 2 are similar to those of Embodiment 1, the descriptions in Embodiment 1 are supposed to be referenced and its description is omitted. The broadcast device 3 includes various mechanisms, such as a controller 30 and a transmitting unit 31 for transmitting a broadcast wave.

Figure 16:
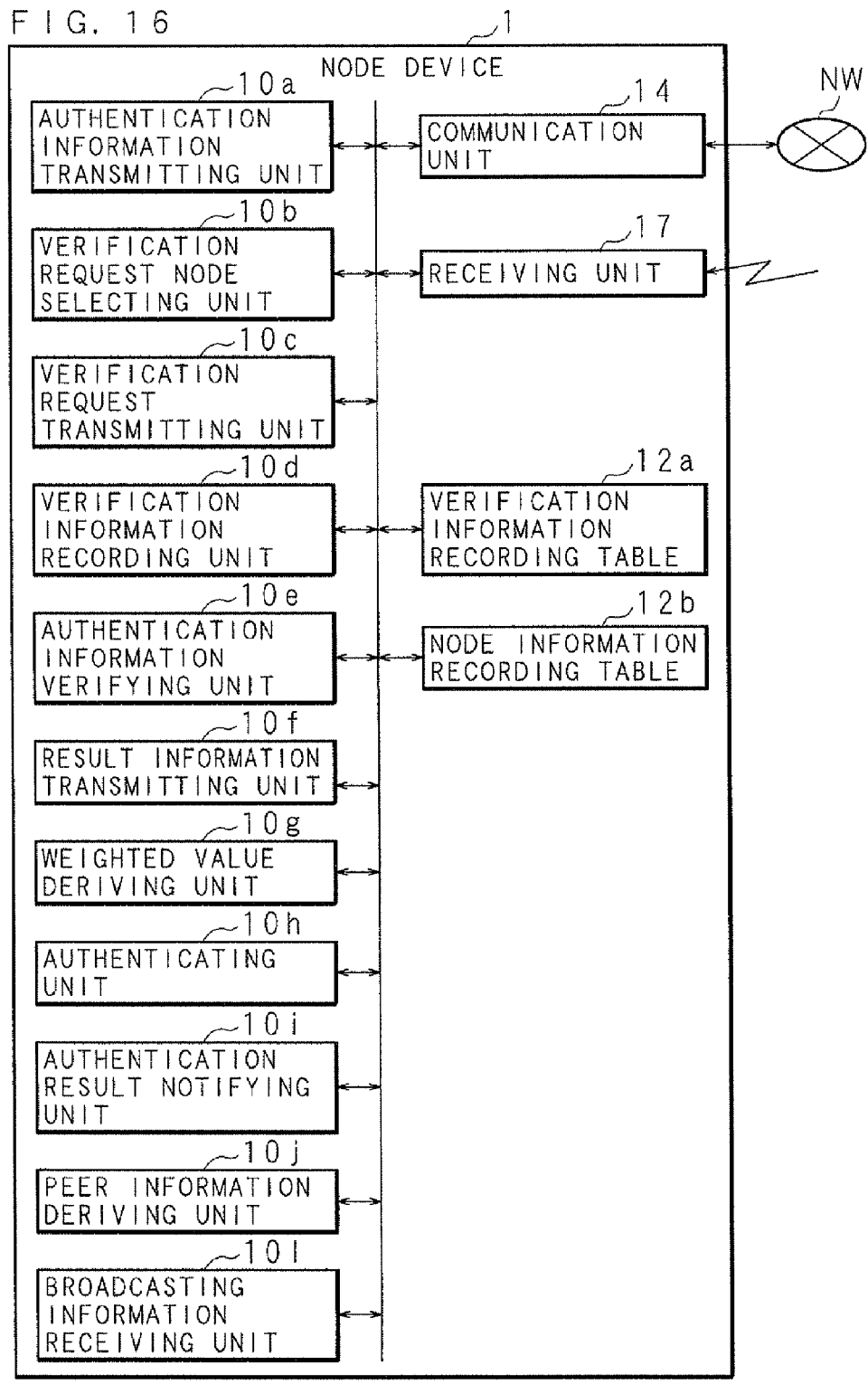
FIG. 16 is a functional block diagram illustrating an example of the software of the node device used in the authentication system according to Embodiment 5.

FIG. 16 is a functional block diagram illustrating an example of the software of the node device 1 used in the authentication system according to Embodiment 5. The node device 1 executes the program 100 under the control of the controller 10, thereby attaining various functions provided by various kinds of program modules, such as an authentication information transmitting unit 10a, a verification request selecting unit 10b, a verification request transmitting unit 10c, a verification information recording unit 10d, an authentication information verifying unit 10e, a result information transmitting unit 10f, a weighted value deriving unit 10g, an authenticating unit 10h, an authentication result notifying unit 10i, a peer information deriving unit 10j and a broadcasting information receiving unit 10l. The broadcasting information receiving unit 10l is a program module that is used to perform various kinds of processing relating to broadcasting information, such as the complement of the broadcasting information.

Moreover, the node device 1 executes the computer program 100 under the control of the controller 10, thereby using part of the recording area of the recording unit 12 as various tables, such as a verification information recording table 12a and a node information recording table 12b. Still further, certificate information for certifying that a regular contract for receiving broadcasting information has been concluded is recorded in the recording unit 12. The certificate information is data distributed from a broadcaster in advance via the communication network NW, for example, and includes a group ID that is used to receive broadcasting information.

Next, the processing performed by the various kinds of devices according to Embodiment 5 will be described below. Since the authentication information delivery processing of the authentication system according to Embodiment 5 is similar to that according to Embodiment 1, the descriptions in Embodiment 1 are supposed to be referenced and its description is omitted.

Figure 17:
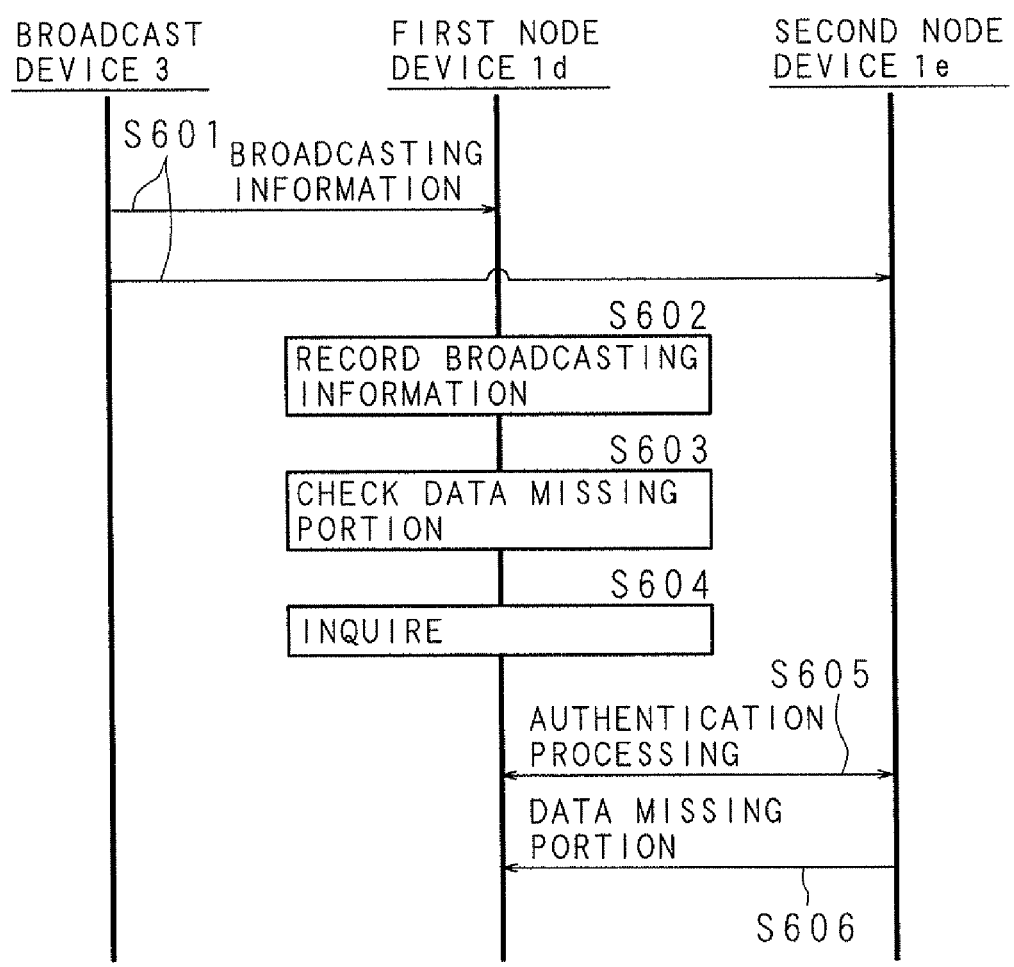
FIG. 17 is a sequence diagram illustrating an example of broadcasting processing in the various kinds of devices used in the authentication system according to Embodiment 5.

FIG. 17 is a sequence diagram illustrating an example of broadcasting processing in the various kinds of devices used in the authentication system according to Embodiment 5. In the following descriptions, a node device 1 requesting a data missing portion is explained as a first node device 1d, and another node device 1 transmitting the data missing portion is explained as a second node device 1e. The broadcast device 3 transmits (broadcasts) broadcasting information superimposed on a broadcast wave from the transmitting unit 31 under the control of the controller 30 (at the operation S601).

By the processing of the broadcasting information receiving unit 10l on the basis of the control of the controller 10 for executing the computer program 100, the first node device 1d records the broadcasting information based on the broadcast wave received by the receiving unit 17 in the recording unit 12 (at the operation S602) and checks whether a data missing portion is present in the recorded broadcasting information (at the operation S603). Various conventional technologies for error checking are used appropriately for the checking of a data missing portion at the operation S603.

When a data missing portion is found by the checking at the operation S603, by the processing of the broadcasting information receiving unit 10*l* on the basis of the control of the controller 10, the first node device 1*d* inquires another node device 1 whether the data missing portion has been recorded therein (at the operation S604).

Under the control of the controller 10, the first node device 1*d* executes authentication processing between the first node device 1*d* and the other node device 1 (second node device 1*e*) in which it is found, by the inquiry at the operation S604, that the data missing portion has been recorded (at the operation S605). The authentication processing at the operation S605 is the authentication processing described in Embodiment 1. In the authentication processing, the first node device 1*d* requesting the data missing portion serves as the object node 1*a*, and the second node device 1*e* in which the data missing portion has been recorded serves as the authentication node 1*b*. When the information indicating the position in the logical space and used for the authentication processing is derived, the group ID of the certificate information is used as the constant α.

When the authentication has succeeded, under the control of the controller 10, the second node device 1*e* transmits the data missing portion of the broadcasting information from the communication unit 14 to the first node device 1*d* via the communication network NW (at the operation S606). By the above-mentioned mutual complement of the data missing portion in the broadcasting information, the broadcaster can guarantee the delivery of the broadcasting information, and the broadcast device 3 is not needed to execute processing, such as the retransmission of the broadcasting information, whereby the processing load and the communication load relating to the broadcast device 3 are reduced. Furthermore, unauthorized acquisition of the broadcasting information may be prevented by using the group ID.

With the present embodiment, the broadcast device for performing broadcasting, such as satellite broadcasting, performs broadcasting to transmit the broadcasting information relating to the broadcasting to the plurality of node devices, and the second node device transmits the data missing portions in the broadcasting information received by the first node device to the first node device the authentication of which has succeeded.

Hence, if a data missing portion occurs in the broadcasting information received by one of the node devices, the present embodiment may be applied to the authentication that is used when the mutual complement is performed between the node devices. For this reason, even if a data missing portion occurs, it is not needed to request retransmission for the broadcast device, for example. Furthermore, since the authentication processing is performed for the complement of the data missing portion, it is possible to prevent unauthorized receiving of broadcasting.

Embodiments 1 to 5 described above are merely examples of some of embodiments that are infinitely available. When the authentication is performed on the basis of the weighted values indicating reliability and the result information indicating the verification result, it is possible to appropriately design various kinds of hardware, various kinds of software and procedures relating to the authentication.

Furthermore, Embodiments 1 to 5 described above can be implemented independently of one another and may also be implemented in appropriate combination if needed.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a showing of the superiority and inferiority of the embodiment. Although the embodiments have been described in detail, it should be understood that the various changes, substitutions, and alterations could be made hereto without departing from the spirit and scope of the embodiment.

What is claimed is:

1. A peer-to-peer (P2P) type authentication system comprising:
   a plurality of node devices; wherein
   a first node device includes a unit for transmitting the authentication information thereof to a second node device,
   the second node device includes
      a unit for selecting a plurality of third node devices that are requested to verify the validity of the received authentication information, and
      a unit for transmitting the received authentication information to each of the selected plurality of third node devices,
   each of the third node device includes
      a unit for recording verification information that is used to verify the validity of the authentication information of the first node device,
      a unit for verifying the validity of the authentication information on the basis of the received authentication information and the recorded verification information, and
      a unit for transmitting the result information indicating the result of the verification to the second node device, and
   the second node device further includes
      a deriving unit for deriving weighted values indicating the reliability of the each verification of the plurality of third node devices and
      a unit for authenticating the first node device on the basis of the each result information and the each weighted value received from the plurality of third node devices,
   wherein any two of the node devices selected from the plurality of node devices communicate with each other.

2. A peer-to-peer (P2P) type authentication system comprising:
   a plurality of node devices; wherein
   a first node device includes a unit for transmitting the authentication information thereof to a second node device,
   the second node device includes
      a deriving unit for deriving weighted values indicating the reliability of verification in the case that a plurality of node devices other than the first node device and the second node device verify the validity of the authentication information of the first node device,
      a unit for selecting a plurality of third node devices that are requested to verify the validity of the authentication information, on the basis of the derived weighted values, from the plurality of node devices from which the weighted values are derived and
      a unit for transmitting the received authentication information to each of the selected plurality of third node devices, each of the third node devices includes
  a unit for recording verification information that is used to verify the validity of the authentication information of the first node device,
  a unit for verifying the validity of the authentication information on the basis of the received authentication information and the recorded verification information, and
  a unit for transmitting the result information indicating the result of the verification to the second node device, and
the second node device further includes a unit for authenticating the first node device on the basis of the result information received from each of the plurality of third node devices and the weighted values derived by the deriving unit, for the plurality of third node devices,
wherein any two of the node devices selected from the plurality of node devices communicate with each other.

3. The P2P type authentication system according to claim 1, wherein
the second node device further includes a unit for deriving position information indicating the position of each of the node devices in a logical space on the basis of identification information for identifying each of the node devices and a function, and
the deriving unit derives each weighted value on the basis of the distance from the first node device obtained from the position information.

4. The P2P type authentication system according to claim 1, wherein the deriving unit derives each weighted value based on the history of the verification of each of the third node devices.

5. The P2P type authentication system according to claim 1 further comprising:
an administrative node device for administrating information relating to each of the node devices, wherein
the administrative node device includes:
  a unit for recording identification information for identifying each of the node devices and the authentication information,
  a unit for deriving position information indicating the position of each of the node devices in the logical space based on the identification information of each of the node devices and a specified function,
  a unit for selecting, on the basis of the distance in the logical space from the position of one node device obtained by the derived position information to the other node devices, a plurality of node devices to which the authentication information of the one node device is transmitted, and
  a unit for transmitting the authentication information of the one node device to the selected plurality of node devices as verification information.

6. The P2P type authentication system according to claim 5, wherein
the second node device further includes
  a unit for determining whether or not the weighted value derived for the third node device that has determined that the verification information is not valid is less than a value and
  a unit for transmitting information indicating the third node device relating to the weighted value in the case that the weighted value is determined to be not less than the value.

7. The P2P type authentication system according to claim 5, wherein
the one node device further includes a unit for transmitting a retransmission request for requesting the retransmission of the verification information thereof to the administrative node device, and
the administrative node device further includes a unit for transmitting the authentication information of the node device serving as a sender having transmitted the received retransmission request to the plurality of node devices selected on the basis of the distances in the logical space as the verification information of the one node device.

8. The P2P type authentication system according to claim 1 further comprising:
a broadcast device for transmitting broadcasting information concerning broadcasting to the plurality of node devices, wherein
the second node device further includes a unit for transmitting a data missing portion in the broadcasting information received by the first node device to the first node device having succeeded in authentication.

9. A peer-to-peer (P2P) type authentication device connected to a communication network for mediating mutual communication with a plurality of node devices comprising:
  a unit for receiving the authentication information of one node device from the one node device,
  a unit for selecting the other plurality of node devices that are requested to verify the validity of the received authentication information,
  a unit for transmitting the received authentication information to each of the other plurality of node devices selected,
  a unit for receiving result information indicating the result of the verification based on the authentication information from each of the selected other node devices,
  a unit for deriving a weighted value indicating the reliability of each verification of the other node devices, and
  a unit for authenticating the one node device based on the each received result information and each weighted value,
wherein any two of the node devices selected from the plurality of node devices communicate with each other.

10. A non-transitory computer-readable recording medium recording a program for causing a computer connected to a peer-to-peer (P2P) communication network for mediating mutual communication with a plurality of node devices to authenticate the validity of the authentication information of one node device, the program comprising:
  selecting, using the computer, the other plurality of node devices that are requested to verify the validity of the received authentication information in the case that the authentication information of the one node device has been received from the one node device,
  transmitting, using the computer, the received authentication information to each of the other plurality of node devices selected,
  deriving, using the computer, the weighted value indicating the reliability of each verification of the other node devices when the result information indicating the verification result based on the authentication information has been received from each of the selected other node devices, and
  authenticating, using the computer, the one node device based on the each received result information and the each weighted value,
wherein any two of the node devices selected from the plurality of node devices communicate with each other.

* * * * *

UNITED STATES PATENT AND TRADEMARK OFFICE
CERTIFICATE OF CORRECTION

PATENT NO. : 8,484,470 B2  
APPLICATION NO. : 12/838851  
DATED : July 9, 2013  
INVENTOR(S) : Hironori Sakakihara et al.

Page 1 of 1

It is certified that error appears in the above-identified patent and that said Letters Patent is hereby corrected as shown below:

On the Title Page Col. 1 (Inventors), Line 5, Delete "Setagaya" and insert -- Shibuya --, therefor.

Signed and Sealed this
Fifth Day of November, 2013

Teresa Stanek Rea
*Deputy Director of the United States Patent and Trademark Office*